United States Patent
Kitajima

(10) Patent No.: US 8,964,105 B2
(45) Date of Patent: Feb. 24, 2015

(54) AUTO-FOCUS CONTROLLING APPARATUS, ELECTRONIC IMAGING APPARATUS AND DIGITAL STILL CAMERA

(75) Inventor: Tatsutoshi Kitajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 166 days.

(21) Appl. No.: 13/521,624

(22) PCT Filed: Jan. 11, 2011

(86) PCT No.: PCT/JP2011/050613
§ 371 (c)(1),
(2), (4) Date: Jul. 11, 2012

(87) PCT Pub. No.: WO2011/087115
PCT Pub. Date: Jul. 21, 2011

(65) Prior Publication Data
US 2013/0135516 A1    May 30, 2013

(30) Foreign Application Priority Data

Jan. 12, 2010    (JP) .................................. 2010-003605

(51) Int. Cl.
*G03B 13/00*    (2006.01)
*H04N 5/232*    (2006.01)
(Continued)

(52) U.S. Cl.
CPC .. *G02B 7/36* (2013.01); *G02B 7/38* (2013.01); *G03B 3/10* (2013.01); *G03B 13/36* (2013.01); *H04N 5/23212* (2013.01)
USPC .............. 348/356; 348/345; 348/349; 396/79

(58) Field of Classification Search
CPC .............. G02B 7/36; G02B 7/38; G03B 3/10; G03B 13/36; H04N 5/23212
USPC ....................... 348/345–357, 371; 396/79–82
See application file for complete search history.

(56) References Cited

U.S. PATENT DOCUMENTS 4,841,370 A * 6/1989 Murashima et al. .......... 348/351
5,005,086 A * 4/1991 Iwamoto et al. .............. 348/356
(Continued)

FOREIGN PATENT DOCUMENTS

JP    1 288814    11/1989
JP    05 007321    1/1993
(Continued)

OTHER PUBLICATIONS

International Search Report issued on Apr. 19, 2011 in PCT/JP11/050613 filed on Jan. 11, 2011.

*Primary Examiner* — Pritham Prabhakher
(74) *Attorney, Agent, or Firm* — Oblon, Spivak, McClelland, Maier & Neustadt, L.L.P.

(57) ABSTRACT

An auto-focus controlling apparatus includes a focus evaluation value generating device generating a focus evaluation value based on image data acquired through the focus lens, a target lens position determining device determining a target lens position, a timing determining device determining a plurality of acquisition lens positions for acquiring the focus evaluation values in a scanning direction from a present lens position of the focus lens toward the target lens position, a scanning device driving the focus lens in the scanning direction, a predicted focus lens position determining device predicting a predicted focus lens position based on the acquired focus evaluation values and a moving device stopping the scanning device to drive the focus lens when the predicted focus lens position is determined and driving the focus lens in the same direction as the scanning direction to move the focus lens to the predicted focus lens position.

12 Claims, 14 Drawing Sheets

(51) Int. Cl.
*G03B 17/00* (2006.01)
*G02B 7/36* (2006.01)
*G02B 7/38* (2006.01)
*G03B 3/10* (2006.01)
*G03B 13/36* (2006.01)

(56) References Cited

U.S. PATENT DOCUMENTS 6,624,851 B1 * 9/2003 Okajima et al. ............. 348/347
2002/0081111 A1 6/2002 Ina et al.
2004/0125229 A1 * 7/2004 Aoyama et al. ............. 348/345
2008/0198257 A1 * 8/2008 Morimoto .................... 348/345
2009/0010631 A1 * 1/2009 Okawara ...................... 396/104

FOREIGN PATENT DOCUMENTS

| | | |
|---|---|---|
| JP | 08 029667 | 2/1996 |
| JP | 2001 141984 | 5/2001 |
| JP | 2001 255451 | 9/2001 |
| JP | 2002 247437 | 8/2002 |
| JP | 2006 91915 | 4/2006 |
| JP | 2006 308884 | 11/2006 |

* cited by examiner

FIG.13

AF EVALUATION VALUE SAMPLING

| fp | 100 | 101 | 103 | 104 | 105 | 106 | 107 | 108 | 109 | 112 | 116 | 120 | 124 |
|---|---|---|---|---|---|---|---|---|---|---|---|---|---|
| CONVENTIONAL SAMPLING POSITION | ■ | - | - | ■ | - | - | - | ■ | - | ■ | ■ | ■ | ■ |
| EVALUATION VALUE | 927 | - | - | 1870 | - | - | - | 2575 | - | 2951 | 2951 | 2575 | 1871 |
| SAMPLING POSITION OF PRESENT INVENTION | - | ▲ | - | - | ▲ | - | ▲ | - | ▲ | - | - | - | - |
| EVALUATION VALUE | - | 1179 | - | - | 2073 | - | 2427 | - | 2703 | - | - | - | - |
| SLOPE | - | - | 447 | - | - | 354 | - | 276 | - | - | - | - | - |

AUTO-FOCUS CONTROLLING APPARATUS, ELECTRONIC IMAGING APPARATUS AND DIGITAL STILL CAMERA

TECHNICAL FIELD

The present invention relates to an improvement of an auto-focus controlling apparatus preferably used an electronic imaging apparatus or a digital still camera.

BACKGROUND ART

Conventionally, an electronic imaging apparatus, for example, a digital still camera has an auto-focus controlling apparatus (referred also to as an auto-focus adjustment apparatus) which converts a subject image into an image signal (image data) by an image pickup device (CCD), and performs a focus adjustment to the subject based on the image signal.

As shown in FIG. 1, in a focus adjustment system by the auto-focus controlling apparatus, a peak value scanning system (so-called climbing AF system or CCDAF system) is generally used, in which by calculating a peak value FVp in a hill-shaped characteristic curve M0 acquired by focus evaluation values FV at lens positions fp of a focus lens fL, an optimum focus lens position fbp corresponding to the peak value FVp is acquired.

The focus evaluation value FV is acquired by acquiring high frequency component of the image signal changed by driving the focus lens fL in an optical axis direction at discretely set lens positions fp.

In FIG. 1, arrow A1 indicates a case where the focus lens is driven in a direction from a lens position fp having a small value to a lens position having a large value to acquire the peak value FVp, and arrow A2 indicates a case where the focus lens is driven in a direction from a lens position fp having a large value to a lens position having a small value to acquire the peak value FVp.

This peak value scanning system is a system for searching the optimum focus lens position fbp corresponding to a focusing state where there is lowest defocus by use of the actual image data and therefore the focus lens fL has a high focusing accuracy to the subject.

On the other hand, since it is necessary to search the optimum focus lens position fbp while actually driving the focus lens, this peak value scanning system has a problem in that searching the optimum focus lens position fbp and setting the focus lens fL to the optimum focus lens position fbp take time.

Then, in order to solve the taking time problem, the conventional peak value scanning system has been proposed, in which a ranging sensor (referred also to as an external AF sensor) for directly measuring a distance to the subject is used, the distance to the subject is measured by the ranging sensor and based on a result of the ranging sensor, scanning at a vicinity of a lens position fp corresponding to the ranging result as a target lens position AFfp is performed so that high speed and high accuracy of the focusing control of the focus lens fL can be achieved (see Japanese Patent Application Publication Nos. 2001-141984 and 2001-255451).

The focus lens fL is generally driven by a mechanical driving mechanism (see FIG. 2) including a motor (pulse motor) driven by pulses and a gear.

By the mechanical driving mechanism including the pulse motor and the gear for driving the focus lens fL, the lens position fp of the focus lens fL in the optical axis direction is determined by controlling a pulse number.

However, in the mechanical driving mechanism, since there exists backlash as shown in FIG. 2, even when the pulse number is the same, the lens position when the focus lens fL is driven in the optical axis direction and in a direction of arrow A1 as a normal direction and set to the optimum focus lens position fbp differs from the lens position when the pulse motor is rotated in a reverse direction and the focus lens fL is driven in a direction of arrow A2 and set to the optimum focus lens position fbp.

In the conventional peak value scanning system, in order to detect a peak value FVp of the focus evaluation values FV, while the focus evaluation value FV increases, exceeds the peak value FVp and then decreases, for example, the focus lens is moved in the A1 direction shown in FIG. 3. Accordingly, when the peak value FVp of the focus evaluation values FV is determined by the calculation, the present lens position frp of the focus lens fL exceeds the optimum focus lens position fbp and is positioned at the end lens position fep' having the focus evaluation value FV smaller than the peak value FVp.

Therefore, it is necessary to return the focus lens fL to the optimum focus lens position fbp judged as a position where a peak of the focus evaluation values exists.

In such a case, in the conventional peak value scanning system, since there exists backlash of the gear, considering the pulse number corresponding to an exceeding amount over the optimum focus lens position fbp and the pulse number corresponding to deviation amount due to backlash, by a pulse number of at least a sum of these pulse numbers or more, the focus lens fL is returned back in the A2 direction and then, by a pulse number required for driving the focus lens fL from a corrected lens position fqp to the optimum focus lens position fbp, the pulse motor is driven to move the focus lens fL in the A1 direction from the corrected lens position fqp to the optimum focus lens position fbp to set the focus lens fL to the optimum focus lens position fbp.

Accordingly, in the conventional peak value scanning system, even if the vicinity of the lens position fp corresponding to the ranging result as the target lens position AFfp is searched, there is a problem in that it takes a time for setting the focus lens fL to the optimum focus lens position fbp.

Furthermore, when changing a rotational direction of the pulse motor, it takes a stop excitation time required for stopping an excitation of the pulse motor.

In the conventional peak value scanning system, in order to set the focus lens fL to the optimum focus lens position fbp, at least twice of the stop excitation time are required.

Therefore, it takes a further time for setting the focus lens fL to the optimum focus lens position fbp.

Furthermore, in a digital still camera having a high magnification zoom lens, even if a perspective range is the same, a focal depth at a telephoto side is small compared to a focal depth at a wide angle side. Accordingly, a scanning range for scanning a peak value by moving the focus lens fL at the telephoto side is larger than that at the wide angle side.

Therefore, every time one focus evaluation value is acquired, the pulse number for driving the focus lens fL toward another lens position fp is increased to reduce the time required for scanning.

Accordingly, if one focus evaluation value FV is acquired after the focus lens fL passes over the optimum focus lens position fbp, and then a decreased value from the peak is detected, an overrun amount of the focus lens fL in each acquired focus evaluation value FV is increased.

As described above, in the conventional peak value scanning system, a control for returning the focus lens by the overrun amount of the focus lens fL after detecting the peak value is required and there is a problem in that a scanning speed in the peak value scanning system is required to be improved.

SUMMARY OF INVENTION

An object of the present invention is to provide an auto-focus controlling apparatus, an electronic imaging apparatus and a digital still camera, in which a time required from when the focus evaluation value is acquired by driving the focus lens to when completing the focusing the focus lens on the subject is reduced.

An auto-focus controlling apparatus according to an embodiment of the present invention is for controlling a focusing operation of a focus lens and includes a focus evaluation value generating device configured to generate a focus evaluation value based on image data of a subject which is acquired through the focus lens to determine a focus lens position of the focus lens to the subject, a target lens position determining device configured to determine a target lens position used in the focusing operation by driving the focus lens, a focus evaluation value acquiring timing determining device configured to determine a plurality of acquisition lens positions in which the focus evaluation values are to be acquired in a direction from a present lens position of the focus lens toward the target lens position, a scanning device configured to drive the focus lens in an optical axis direction and in the direction from the present lens position of the focus lens to the target lens position to acquire the focus evaluation value at each of the plurality of acquisition lens positions, a predicted focus lens position determining device configured to predict a predicted focus lens position based on the acquired focus evaluation values to determine the predicted focus lens position, and a moving device configured to stop the scanning device to drive the focus lens when the predicted focus lens position is determined and to drive the focus lens in a direction where the focus lens is driven by the scanning device to move the focus lens to the predicted focus lens position.

BRIEF DESCRIPTION OF DRAWINGS

FIG. 13 is a view showing numeric values of the focus evaluation values acquired at the acquisition lens positions shown in FIG. 12.

MODE FOR CARRYING OUT THE INVENTION

Preferred embodiments of the present invention will be explained in detail with reference to the accompanying drawings below.

Figure 4:
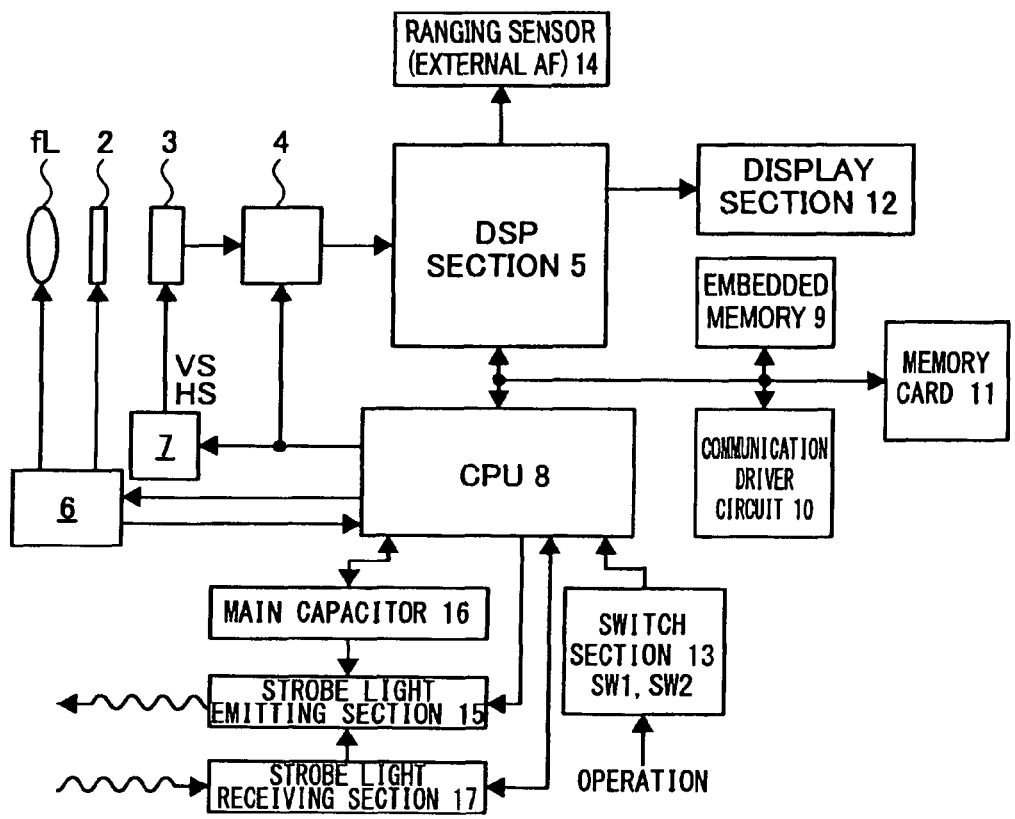
FIG. 4 is a block circuit diagram including an optical system of the digital still camera according to an embodiment of the present invention.

FIG. 4 is a block diagram schematically showing a circuit configuration of a digital camera, which is capable of recording a still image, as an electronic imaging apparatus having an auto-focus controlling apparatus according to an embodiment of the present invention.

In FIG. 4, fL indicates a focus lens, 2 an aperture-mechanical shutter which also has a function of an aperture, 3 an image pickup device (CCD), 4 an FE-IC 102 circuit section, 5 a digital still camera processor (DSP) section, 6 a driver section, 7 a CCD driving circuit section, 8 a central processing unit (CPU), 9 an embedded memory, 10 a communication driver circuit section, 11 a memory card, 12 a display section, 13 a switch section, 14 a ranging sensor (external AF), 15 a strobe light emitting section, 16 a main capacitor, and 17 a strobe light receiving section.

The FE-IC 102 circuit 4 has a well-known function of performing a correlated double sampling of an image signal from the image pickup device 3, a function of performing an automatic gain control (AGC), and a well-known function of converting image signal acquired by the image pickup device 3 into image data, that is, an A/D converting function.

The digital still camera processor section 5 has a function of converting digital signals (imaging signal after performing an A/D conversion) into YUV data, and a function of performing a processing of digital signals, that is, a JPEG-compression of the YUV data, and the like.

The driver section 6 includes a mechanical driving mechanism as a scanning device configured to drive the focus lens fL in an optical axis direction in cooperation with the CPU 8, and a shutter driving mechanism configured to drive the aperture-mechanical shutter 2 to be opened and closed. In the mechanical driving mechanism, a well-known lens position detecting section is provided.

The mechanical driving mechanism generally comprises a not-illustrated pulse motor and a gear lines similarly to the conventional mechanism.

The pulse motor is controlled to be driven by a pulse output from the CPU 8 as a moving device and the focus lens fL is controlled to be driven by a pulse from the CPU 8.

The CCD driving circuit section 7 drives the image pickup device 3 to output an image signal to the FE-IC 102 circuit section 4 based on synchronization signals (vertical synchronization signal VS and horizontal synchronization signal HS) from the CPU 8. The CPU 8 operates overall controls of functions of the digital still camera as a whole.

The embedded memory 9 has a function of temporarily storing image data acquired by the image pickup device and read data stored in the memory card 11.

The embedded memory 9 is also used as a working memory of the digital still camera processor section 5 and the CPU 8. The memory card 11 is attachably and detachably installed in the digital still camera.

The communication driver circuit 10 is used for communicating with an external device such as a personal computer, a printer, and the like.

The display section 12 is composed of a not-illustrated liquid crystal display and a not-illustrated display controller section configured to convert the image data from the digital still camera processor section 5 into a signal to be displayed on the liquid crystal display.

The switch section 13 includes various switches, such as a shutter button required to operate the digital still camera, a mode dial, a wide angle/telephoto zoom switch, a self-timer switch, a menu switch, a strobe switch, and the like.

A user of the digital still camera operates the switch section 13 to perform a desired processing of the digital still camera. SW1 indicates a first switch of the shutter button, and SW2 indicates a second switch of the shutter button.

The ranging sensor 14 is configured to measure a distance to a subject by performing a ranging based on a so-called triangulation method. In the ranging sensor 14, a floodlight type method, a passive type method for measure a distance to the subject based on a defocus amount to the subject, or a sonar detection method may be used.

The strobe light emitting section 15 is controlled to emit the light based on a control signal from the CPU 8. The main capacitor 16 reserves an electrical power for emitting strobe light. The CPU 8 has a function of monitoring a charging voltage of the main capacitor 16.

The strobe light receiving section 17 is composed of a light receiving optical system, a light-receiving sensor, and a light emitting stop circuit section, which are not illustrated. The CPU 8 outputs a light receiving command signal to the strobe light receiving section 17 and outputs a setting value signal for stopping light emitting to the strobe light receiving section 17.

The light-receiving sensor starts to receive light based on the light receiving command signal from the CPU 8 and when an accumulated receiving light amount runs to a setting value, the light emitting stop circuit section outputs a light emitting stop signal to the strobe light emitting section 15.

Figure 5:
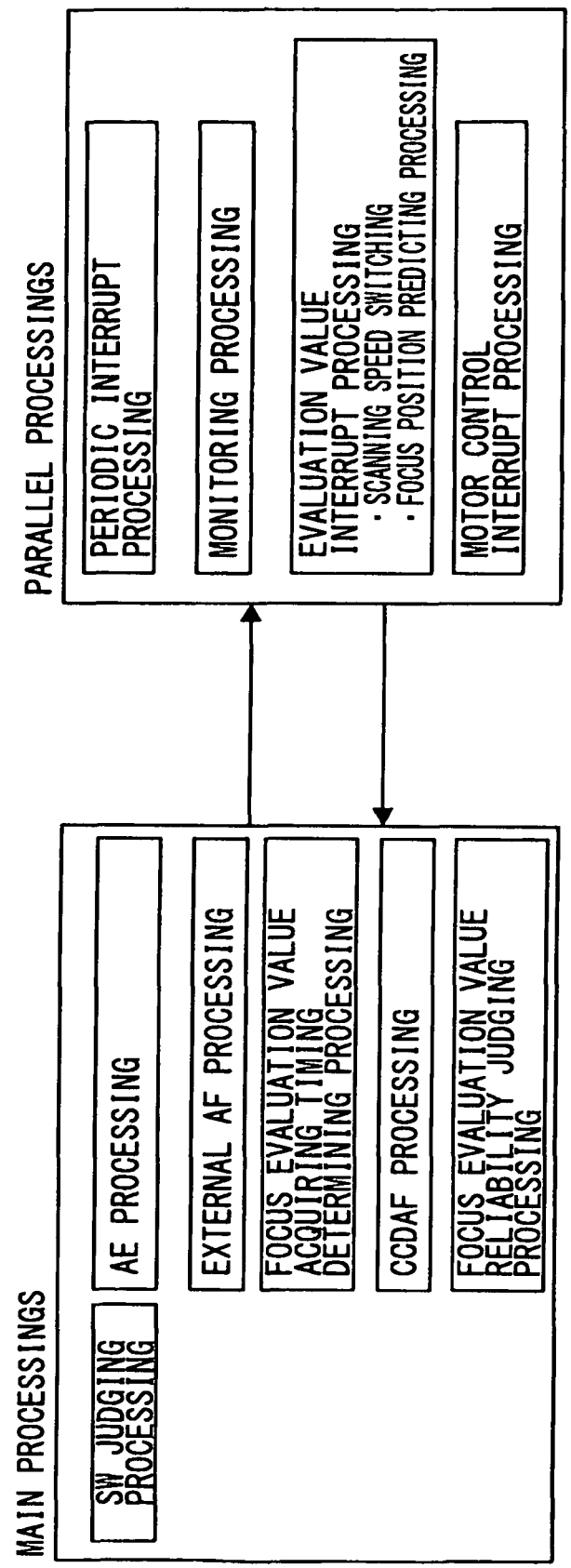
FIG. 5 is an explanatory view schematically showing a relationship between main processings and parallel processings of the digital still camera according to an embodiment of the present invention.

The CPU 8 performs main processings and parallel processings shown in FIG. 5 in cooperation with processing devices such as the digital still camera processor section 5, the driver section 6, the image pickup device 3 and the like. The main processings are, for example, a switch state judging processing (SW judging processing) for judging a switch state, an exposure evaluation value acquiring processing (focus evaluation value generating means (AE processing)) for acquiring an exposure evaluation value, a ranging processing (referred also to as an external AF processing) for calculating a distance to the subject based on a ranging result acquired by the ranging sensor 14, a focus evaluation value acquiring timing determining processing (focus evaluation value acquiring timing determining means) for determining a timing of acquiring a later-described focus evaluation value FV, a scanning processing (referred also as to a scanning means (CCDAF processing)) for discretely acquiring the focus evaluation value FV by actually driving the focus lens fL, and a focus evaluation value reliability judging processing (judging means) for judging a reliability of a later-described predicted focus lens position fP'''.

The parallel processings are interrupt processings which are performed while the main processing is performed. The parallel processings are particularly, a periodic interrupt processing, a monitoring processing for monitoring a subject image before photographing the subject, an evaluation value interrupt processing for changing a speed of the pulse motor by judging whether or not the focus evaluation value FV is acquired during the scanning processing (CCDAF) by driving the focus lens fL as well as for calculating a predicted focus lens position fp'', and a motor control interrupt processing for performing a speed control of a driving speed of the pulse motor and a stop control of the pulse motor. The parallel processings will be described below.

Information transfer is performed between processing information of the parallel processings and processing information of the main processings, as shown by arrows in FIG. 5, and therefore the processing information is sequentially updated.

FIG. 5 is an explanation view schematically showing a relationship between the main processings and the parallel processings.

The monitoring processing is periodically performed. Periodic interruption processing will be explained.

The periodic interrupt processing is activated by a periodic timer and then, for example, processing for allowing the CPU 8 to read the switch state of the switch section 13 shown in FIG. 4 is performed.

The evaluation value interrupt processing is performed when the image data acquired based on an exposure for each vertical synchronization signal VS is processed and then the exposure evaluation value (AE evaluation value) is generated.

The motor control interrupt processing is permitted after parameters of the driving speed for controlling the pulse motor and the target lens position AFfp are set during the scanning processing in the main processings.

An interrupt is generated at a driving timing corresponding to control phase of the pulse motor after the interrupt processing is started and the motor control interrupt processing is performed at the timing when the interrupt is generated. In the motor control interrupt processing, driving parameters are checked and the control is changed so as to correspond to the change in the driving parameters.

Figure 6:
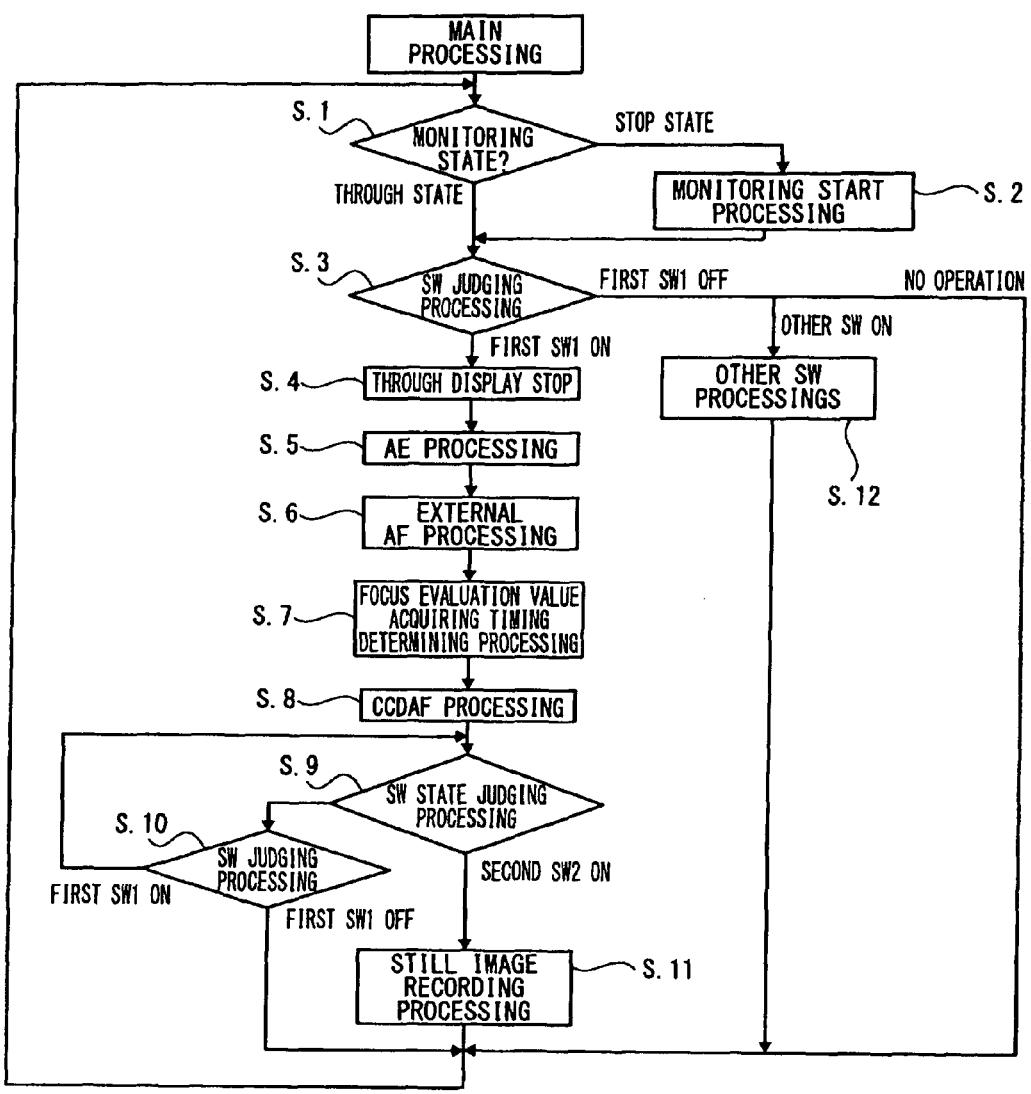
FIG. 6 is a flowchart for explaining the main processings of the digital still camera according to an embodiment of the present invention.

In a still image recording mode, when the power of the digital still camera is turned on, an initialization of a not-illustrated hardware in the digital still camera, an initialization where file information in the memory card 11 is formed in the embedded memory 9, and the like are performed and then the main processings shown in FIG. 6 are performed.

In the main processings, as shown in FIG. 6, a monitoring state is checked (S.1), and if the monitoring state is a monitoring stop state, a monitoring start processing is performed (S.2). The monitoring start processing is a processing for starting to drive the image pickup device 3 and activate the monitoring processing in the parallel processings. Also, when the processing flow returns to the first step S.1. as shown in FIG. 6 while the parallel processings other than the monitoring processing are performed, the monitoring start processing is performed (S.2).

During the monitoring processing, the digital still camera processor section 5 outputs the image signal acquired by the image pickup device 3 to the display section 12 (see FIG. 4). Thereby, a through image (moving image) is displayed on the liquid crystal display of the display section 12.

In the monitoring processing, when the through image is displayed on the liquid crystal display of the digital still camera, the digital still camera processor section 5 performs a tracking processing by calculating an exposure amount evaluation value AE and a white balance evaluation value AWB based on the image signal from the image pickup device 3.

The CPU 8 receives the above evaluation values and outputs a control signal to a not-illustrated timing generator (TG generator) of the CCD driving circuit section 7 so as to set the evaluation values to be predetermined values and thereby, an electronic shutter driving timing (electronic shutter time) of the image pickup device (CCD) 3 is set.

By the monitoring processing, coloring and brightness of the through image is maintained appropriate. The monitoring processing is performed, for example, by a periodic timer interrupt processing every 20 ms.

The electronic shutter of the image pickup device 3 has a maximum time and minimum time within a settable time. That is, electronic shutter driving time of the CCD has an upper limit and a lower limit. When the exposure is under the lower limit or over the upper limit, that is, when the over-limit exposure and the under-limit exposure are not avoided only by the electronic shutter driving timing, in accordance with the brightness of the subject, the CPU 8 controls the driver section 6 to be driven to change a diameter of the aperture of the aperture-mechanical shutter section 2 or controls the automatic gain control (AGC) function of the FE-IC102 circuit section 4 to change an amplification factor of the image signal so as to acquire an appropriate exposure amount.

Further, the CPU 8 performs a feedback control for adjusting a color parameter by image processing of the digital still camera processor section 5. That is, the CPU 8 performs an adjusting processing of the parameter of the white balance evaluation value AWB.

The CPU 8 judges a state of the switch section 13 during monitoring (S.3). The judgment of the state by the CPU 8 is performed based on reading of the switch state of the switch section 13 on the CPU 8. The reading processing of the switch state of the switch section 13 on the CPU 8 is also performed by the periodic timer interrupt every 20 ms.

The CPU 8 judges switch information input by the periodic timer interrupt processing every 20 ms. The CPU 8 judges whether or not the first switch (half-pressed switch) SW1 of the shutter button of the switch section 13 is turned on in the step S.3.

If the first switch SW1 is turned on, the CPU 8 performs the processings of S.4 to S.11. If the first switch SW1 is turned off, the CPU 8 judges whether or not the switches other than the first switch SW1 in the switch section 13 is operated. The CPU 8 performs a processing corresponding to the operated switch (S.12). If no switch is operated during performing the main processings as a loop processing, the processing flow returns to the step S.1 and the CPU 8 performs the main processings as a loop processing.

If a strobe photographing mode is selected, after the monitoring start processing is performed (S.2), it is checked whether a strobe charging is completed. After a not-illustrated charging start processing is performed if the charging is required, the state judging processing of the switch section is performed (S.3) but the explanation is omitted.

Hereinafter, the main processings for a still image photographing will be explained.

In the step S.3, when the first switch SW1 of the shutter button is turned on, the CPU 8 performs the monitoring stop processing (S.4) and then performs the exposure value evaluation processing (AE processing) (S.5). In the AE processing (S.5), the exposure amount evaluation value is acquired and the exposure time of the image pickup device 3 is set as well as the amplification factor of the automatic gain control (AGC) being set.

That is, when photographing the still image, if the first switch SW1 of the shutter button is turned on, the CPU 8 performs the AE processing in cooperation with the digital still camera processor section 5 to evaluate the image data and determine an exposure time value of the image pickup device 3 to be set and an amplification factor of the image signal to be set in the CCD driving circuit section 7.

Next, the CPU 8 performs the ranging processing by the ranging sensor 14 (S.6). In the ranging sensor (external AF sensor) 14, triangulation method is generally used and such a ranging sensor 14 is disclosed in Japanese Patent Application Publication No. 2001-255451 and therefore the detailed explanation is omitted.

In the embedded memory (adjust memory) 9, a relationship between a ranged value acquired by the ranging sensor 14 and a target lens position AFfp based on the ranged value is stored.

The CPU 8 calculates the target lens position AFfp with reference to an adjusting value based on the ranging result by the ranging sensor 14.

Here, it is assumed that the target lens position AFfp is 109, and the focus evaluation value acquiring timing determining processing (S.7) will be explained. The focus evaluation value acquiring timing determining processing is performed in line with a program of the CPU 8.

A scanning range (driving range in an optical axis direction) of the focus lens fL in performing the scanning processing for acquiring the focus evaluation value FV by driving the focus lens fL is set to a range at a vicinity of the target lens position AFfp to be scanned.

By scanning lens positions fp at the vicinity of the target lens position AFfp, the focus lens fL can be rapidly positioned to a vicinity of an optimum focus lens position fbp.

Here, the focus evaluation value acquiring timing determining processing will be explained as a processing for determining the lens position fp for acquiring a focus evaluation value. However, the processing may be for determining a timing of acquiring a focus evaluation value based on a time for acquiring the focus evaluation value.

In the explanation hereinafter, a lens position fp for acquiring the focus evaluation value, that is, a start lens position, an intermediate position, and an end lens position for acquiring the focus evaluation values indicate a acquisition lens position fp', that is, fsp', fp', and fep', respectively.

Here, the start lens position fsp' is a first lens position for starting to acquire the focus evaluation value, the intermediate lens position fp' is a lens position fp between the start lens position fsp' and the end lens position fep', and the end lens position fep' is a lens position fp where the focus evaluation value is finally acquired. These lens positions are lens positions fp for acquiring the focus evaluation values and therefore referred also to as the acquisition lens positions fp'.

As described above, the target lens position AFfp is a lens position fp which is determined based on a ranging value acquired by the ranging sensor 14, and the optimum focus lens position fbp is a lens position fp which is calculated by a peak value FVp in a hill-shaped characteristic curve MO.

Example 1

The CPU 8 sets an array Scfpf[ ] for determining lens positions fp' for acquiring focus evaluation values. The number of elements indicating an array number of the array Scfp[ ] is appropriately changed. Here, the number n of elements is one hundred.

In the array Scfp[ ], the lens position fp' is sequentially stored. In the array Scfp[ ], the start lens position fsp', the end lens position fep' and the intermediate lens positions fp' between the start lens position fsp' and the end lens position fep' are stored based on a present lens position frp of the focus lens fL.

Here, the start lens position fsp' is stored in the array Scfp[ ] of the maximum number array, and the end lens position fep' is stored in the array Scfp[0] of the minimum number array.

The end lens position fep' is determined by the target lens position AFfp. In this Example, the end lens position fep' is set to be equal to the target lens position AFfp.

This is because it is highly possible that the optimum focus lens position fbp is positioned at the vicinity of the target lens position AFfp.

The end lens position fep' is changeable during the later-described processing according to properties of the acquired focus evaluation value.

Here, on the assumption that the start lens position fsp' is smaller than the target lens position AFfp, with reference to the flowchart shown in FIG. 7 and a characteristic curve MO shown in FIG. 8, the focus evaluation value acquiring timing determining processing will be explained.

A variable n is set such that n=0, and the end lens position fep' is set such that fep'=AFfp (S.21). Then, the end lens position fep' is stored in the array Scfp[0] (S.22). That is, [AFfp] is stored in the array Scfp[0]. Here, the target lens position AFfp is assumed as 109, the end lens position fep' is 109.

Next, a variable n+1 is set to the variable n, and a processing of Scfp[n]=Scfp[n−1]−2 is performed. That is, [AFfp−2] is stored in the array Scfp[1] (S.23). Here, a number "2" indicates two-pulses driving of the pulse motor. That is, the focus evaluation value FV is acquired at the acquisition lens position fp' every driving with an interval of two pulses.

The focus evaluation value FV is acquired at the acquisition lens position fp' of the focus lens fL every two pulses as the interval. This is because the lens positions are positioned with fine intervals at a vicinity of the optimum focus lens position fbp and therefore an accuracy for detecting the peak of the focus evaluation value FV is improved. Here, the end lens position fep' is 109 and therefore the acquisition lens position fp' stored in the array Scfp[1] is 107.

Then, the present lens position frp of the focus lens fL is compared with the acquisition lens position fp' stored in the array Scfp[n] at the present time (S.24).

If the present lens position frp of the focus lens fL is smaller than the acquisition lens position fp' stored in the array Scfp [n] at the present time, it is judged as "No" and then it is judged whether or not the variable n is smaller than 2 (S.25).

In the step S.25, the variable n is 1 (n=1), it is judged as "Yes", and the processing flow returns to the step S.23 and the variable n+1 is set to the variable n, and then the processing of Scfp[n]=Scfp[n−1]−2 is performed. Thereby, [AFfp−4] is stored in the array Scfp[2]. The acquisition lens position fp' acquired at the previous time is "107", and therefore "105" is stored in the array Scfp[2].

Then, the present lens position frp of the focus lens fL is compared with the acquisition lens position fp' acquired at this time and stored in the array Scfp[n] (S.24). If the present lens position frp of the focus lens fL is smaller than the acquisition lens position fp' stored in the array Scfp[n] at the present time, it is judged as "No", and then judges whether or not the variable n is smaller than 2 (S.25).

In the processings of S.23 to S.25, if the present lens position frp of the focus lens fL is equal to or more than the acquisition lens position fp' acquired at the present time and stored in the array Scfp[n] at the present time, it is judged as "Yes" in the step S.24. Then, the lens positions fp' having fixed differences are stored in the array Scfp[ ] (S.26).

Thereby, the focus evaluation value acquiring timing determining processing is completed, and the processing flow returns once to the main processings shown in FIG. 6.

Figure 8:
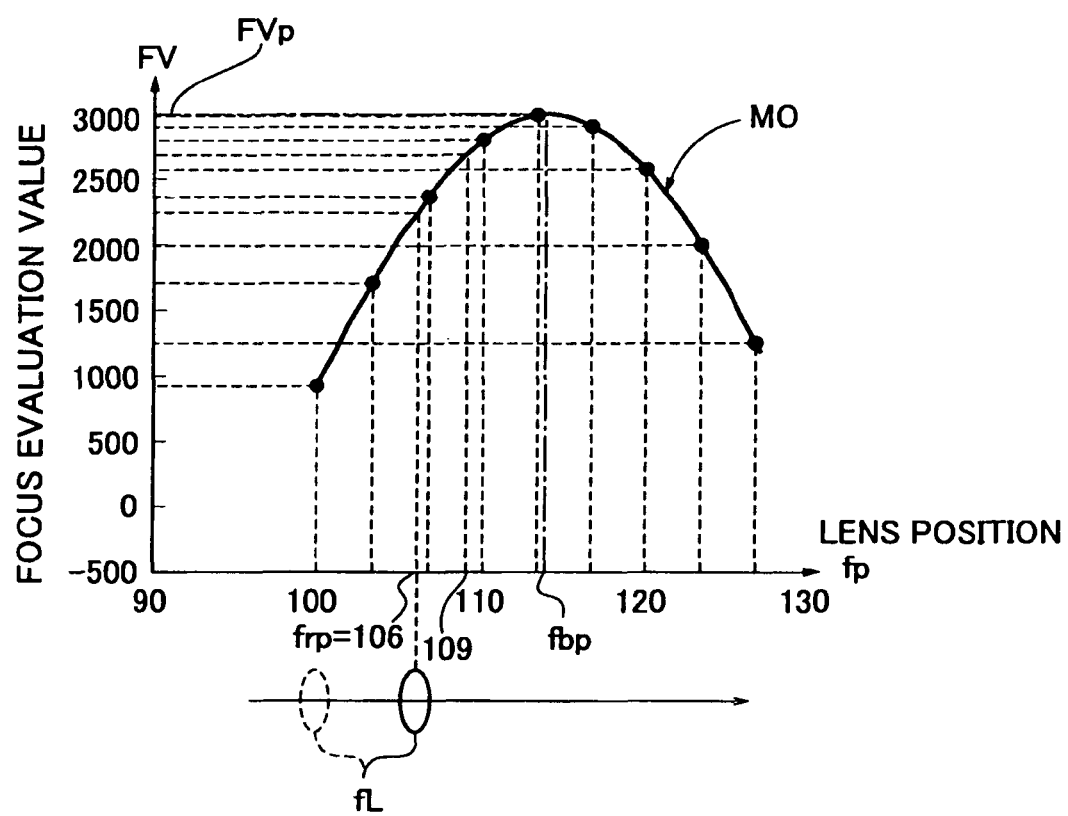
FIG. 8 is a supplementary explanatory view showing processing procedures of the focus evaluation value acquiring timing determining processing shown in FIG. 7.

For example, if the present lens position frp of the focus lens fL is 106 (that is, frp=106) as shown in FIG. 8, for the lens position fp' acquired at this time, since Scfp[2]=Scfp[1]−2=AFfp−4=105, it is judged as "Yes" in the step S.24. Therefore, for example, the lens position fp' having a fixed different "1", that is fp'=AFfp−3=106 is stored in the array Scfp[2].

In this case, the array Scfp[n] used for the scanning processing includes three positions, that is, Scfp[0]=AFfp=109, Scfp[1]=AFfp−2=107, and Scfp[2]=AFfp−3=106.

In the step S.24, in each step of acquiring the acquisition lens position fp' to be stored in the array Scfp[n], the present lens position frp is compared with the acquisition lens position fp' stored in the array Scfp[n] at the present time. This is because, three acquisition lens positions fp' cannot be acquired if the interval between the optimum lens position fbp and the present lens position frp is finely defined by driving the pulse motor every two pluses and three focus evaluation values FV with the interval of two pulses are acquired, and further the interval between the optimum focus lens position fbp and the present lens position frp is smaller than a five-pulses interval.

If the CPU 8 judges that the variable n is 2 or more, that is, judges "No" in the step S.25, the CPU 8 sets the variable n+1 to the variable n, and then the processing of Scfp[n]=Scfp[n−1]−4 is performed (S.27).

Here, the variable n is 2 (n=2), and therefore the variable n is set such that n=3, and the processing of Scfp[3]=Scfp[2]−4=105−4=101 is performed. That is, the acquisition lens position fp' acquired at the previous time is "105", and therefore "101" is stored in the array Scfp[3].

A number "4" indicates four-pulses driving of the pulse motor. That is, the focus evaluation value FV is acquired at the acquisition lens position fp' every driving with an interval of four pulses.

The focus evaluation value FV is acquired at the acquisition lens position fp' of the focus lens fL every four pulses as the interval. This is because the focus lens IL is rapidly moved close to the optimum focus position fbp.

Then, the present lens position frp of the focus lens fL is compared with the acquisition lens position fp' stored in the array Scfp[n] at the present time (S.28).

For example, on the assumption that the present lens position frp of the focus lens fL is 95 (that is, frp=95), the acquisition lens position fp' acquired at the present time is 101 (that is, fp'=101) and therefore the CPU 8 judges that the present lens position frp=95 of the focus lens fL is smaller than the acquisition lens position fp' acquired at the present time, that is, judges "No" in the step S.28.

If it is judged as "No" in the step S.28, the CPU 8 judges whether or not the variable n is smaller than 100 (S.29).

Here, the variable n is 3 (n=3) and therefore it is judged as "Yes" and the processing flow returns to the step S.27, and then the CPU 8 sets the variable n+1 to the variable n, and the processing of Scfp[n]=Scfp[n−1]−4 is performed. Thereby, the array Scfp[4]=Scfp[3]−4=97 is stored.

Then, the present lens position frp=95 is compared with the lens position fp'=97 acquired at the present time and stored in the array Scfp[n] at the present time (S.28).

The lens position fp' acquired at the present time is 97 (that is, fp'=97) and therefore it is judged that the present lens position frp=95 of the focus lens fL is smaller than the lens position fp'=97 acquired at the present time, that is, it is judged as "No".

Then, the CPU 8 judges whether or not the variable n is smaller than 100 (S.29). Here, the variable n is 4 (that is, n=4), and therefore it is judged as "Yes" in the step S.28 and the processing flow returns to the step S.27. Then the variable n+1 is set to the variable n, and the processing of Scfp[n]=Scfp[n−1]−4 is performed. Thereby, Scfp[5]=Scfp[4]−4=93 is stored in the array Scfp[5].

Then, the CPU 8 compare the present lens position frp=95 with the lens position fp'=93 acquired at the present time and stored in the array Scfp[n] at the present time (S.28).

The present lens position frp is "95" and the lens position fp' acquired at the present time is 93 stored in the array Scfp[5] and therefore it is judged that the present lens position frp=95 of the focus lens fL is larger than the lens position fp'=93 acquired at the present time, that is, it is judged as "Yes".

Then, the CPU 8 sets the variable n−1 to the variable n (S.30), and the lens position timing determining processing for acquiring a focus evaluation value is completed. As a result, the lens position "97" stored in the array Scfp[4] is determined as the start lens position fsp'.

Thereby, in a case where the present lens position frp is smaller than the target lens position AFfp, the acquisition lens positions are determined from a position having a large number to a position having a small number.

Figure 1:
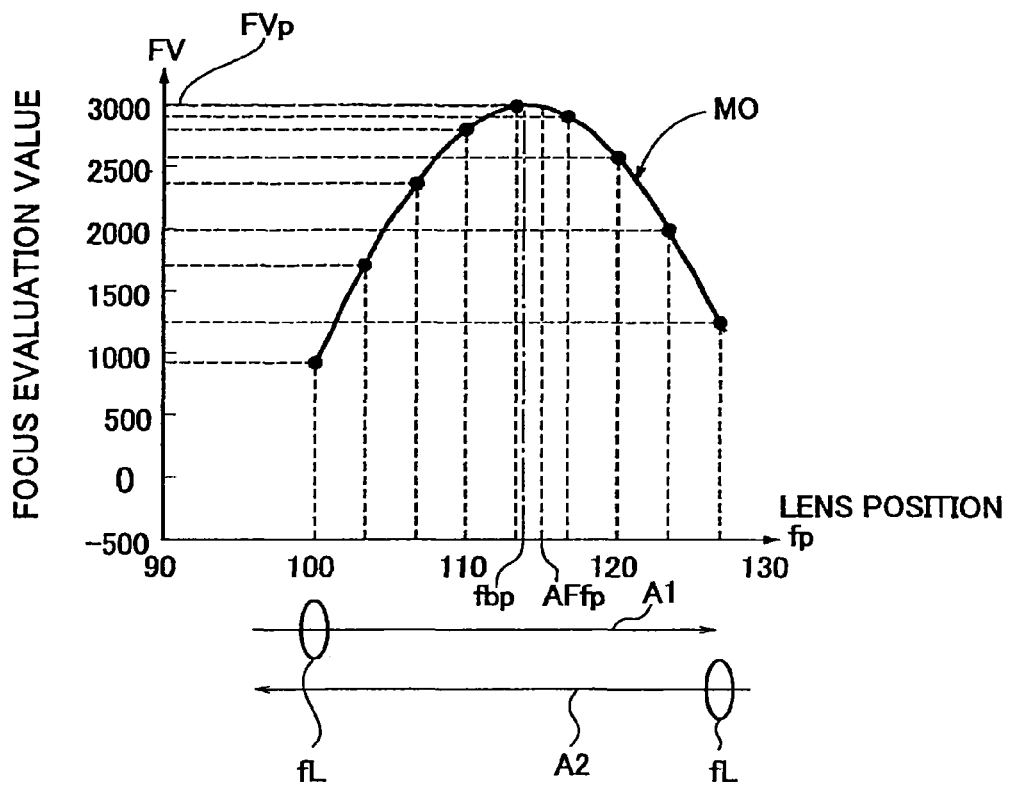
FIG. 1 is an explanatory view schematically showing an example of a conventional peak value scanning system.
Figure 7:
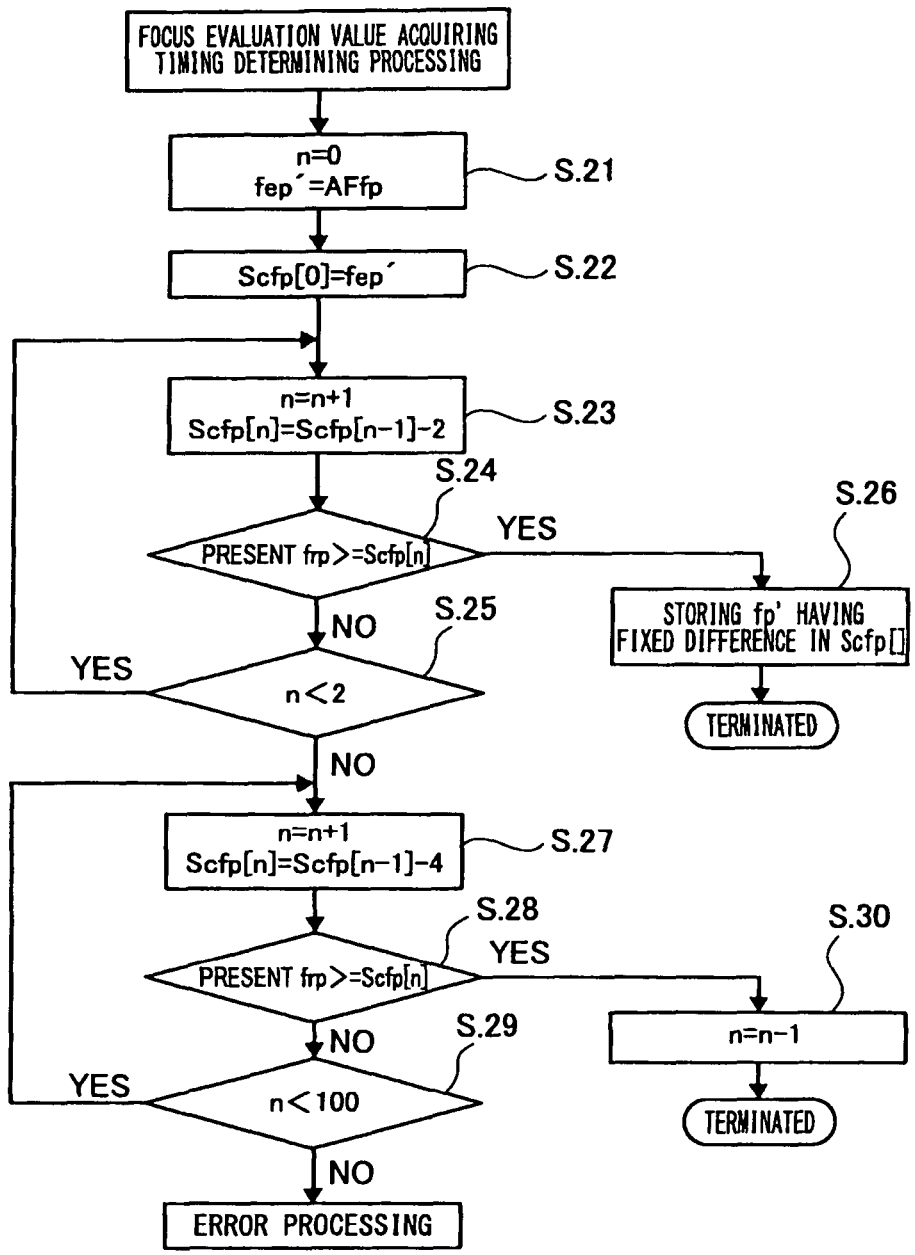
FIG. 7 is a flowchart of a focus evaluation value acquiring timing determining processing shown in FIG. 6.

The flowchart shown in FIG. 7 of the focus evaluation value acquiring timing determining processing is explained as a processing under the condition where the present lens position frp is smaller than the target lens position AFfp, for convenience of the explanation. If the present lens position frp is equal to or more than the target lens position AFfp, the judging conditions of S.24 and S.28 are reversed and the intervals in the steps S.23 and S.27 are set to four pulses to be increased and therefore the explanation is omitted. In this case, a scanning direction of the focus lens fL corresponds to a direction shown by arrow A2 in FIG. 1. In this case, the lens positions fp are determined from a position having a small number to a position having a large number.

The CPU 8 performs a error processing if the present lens position frp is smaller than the lens position fp' acquired at this time even when the processings of the steps S.27 to S.29 are repeated one hundred times. The explanation of the error processing is omitted.

After the CPU 8 performs the focus evaluation value acquiring timing determining processing (S.7), the CPU performs the scanning processing (the step S.8 in FIG. 6) for acquiring the focus evaluation value FV by actually driving the focus lens fL.

As described above, in this Example 1, if a lens position interval between the start lens position fsp' and the end lens position fep' of the scanning processing is large, the focus lens fL is driven with the four pulse interval and the focus lens fL is driven with two pulse interval at the vicinity of the target lens position AFfp so that the focus evaluation value FV can be rapidly acquired. The focus evaluation value FV is finely acquired at the vicinity of the target lens position AFfp so that the accuracy of detecting the focus position can be improved.

It can be appropriately selected which pulse interval is used for driving the focus lens fL according to the image processing system including an optical system of the digital still camera and it is preferably determined mainly in accordance with a focal depth of the focus lens fL.

Next, the scanning processing (S.8) in the main processings shown in FIG. 6 will be explained with reference to the flowchart shown in FIG. 9.

In the scanning processing, a memory CCDAFmode for judging a scanning mode is prepared and a flag "1", a flag "2", and a flag "3" are prepared. The flag "1" indicates a focus predicting mode, the flag "2" indicates a conventional peak value scanning mode, and the flag "3" indicates a predetermined position mode. The set of the flags "2" and "3" will be later described.

The CPU 8 sets the memory CCDAFmode=1 (S.31) when the scanning processing (S.8) starts during performing the main processings.

Then, the CPU 8 performs a scanning start processing (S.32). In the scanning start processing (S.32), a parameter of interrupt of a motor control timer interrupt processing are set at timings corresponding to the present lens position frp, the start lens position fsp' in the array Scfp[n] determined in the focus evaluation value acquiring timing determining processing (S.7 in FIG. 6), the intermediate lens position fp' and the end lens position fep', and the motor control timer interrupt is permitted.

Thereby, the driving of the pulse motor is started and the focus lens fL is actually driven, for example, in a direction of arrow A1. Next, the CPU 8 judges whether or not the scanning is completed (S.33). The step S.33 is repeated until the scanning is completed. This loop of S.33 is referred to as a scanning processing stop waiting loop, hereinafter.

Then, the CPU 8 judges the scanning mode judging memory CCDAFmode (S.34). If CCDAFmode=1, the CPU 8 performs a processing for judging the focal depth in the step S.36, and judges whether or not the lens position at that time (the lens position fp acquired by a calculation using a predicted focus lens position fp"), that is, the calculated predicted focus lens position fp" is within a focal depth range. If the position fp" is out of the focal depth range in the step S.37, it is judged that the lens position is required to be moved, and the processing flow moves to the step S.38 and the lens position is moved to the predicted focus lens position fp".

If the lens position is not required to be moved, the processing flow directly moves to the switch state judging processing (see S.9 in FIG. 6).

In the step S.34, if the CCDAFmode is not "1", the processing flow moves to S.35 and it is judged whether the CCDAFmode is "2" or "3".

If the CCDAFmode=2, after the CPU 8 performs an over-run correction control processing (S.39), the processing flow moves to the switch state judging processing (see S.9 in FIG. 6).

If the CCDAFmode=3, after the CPU 8 performs a predetermined position driving control processing (S.40), the processing flow moves to the switch state judging processing (see S.9 in FIG. 6).

These processings S.34, S.35, S.39 and S.40 will be later described.

A timing of generating evaluation value during the pulse motor driving processing in the scanning processing of S.33 and a timing of the evaluation value interrupt processing will be explained with reference to FIG. 10.

Figure 10:
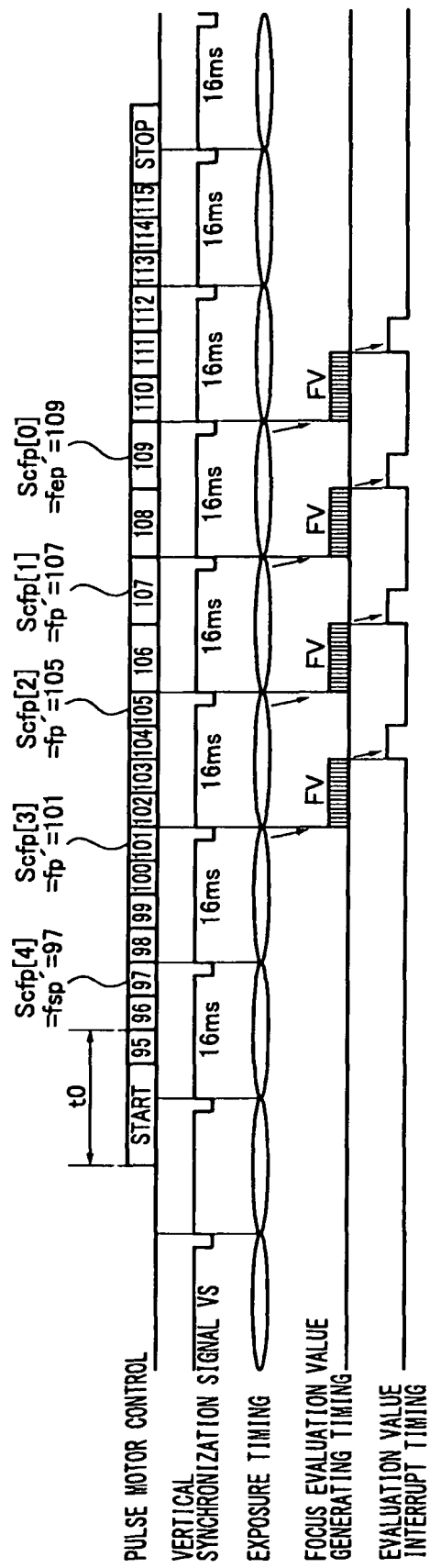
FIG. 10 is a view showing a relationship among a focus evaluation value generating timing shown in FIG. 7, a vertical synchronization timing, an exposure timing, an evaluation value interrupt timing, and a control of a pulse motor.

FIG. 10 shows a relationship among the lens position fp of the focus lens fL by the motor control, the vertical synchronization signal VS, an exposure timing, a focus evaluation value generating timing, and the evaluation value interrupt timing.

The present lens position frp of the focus lens fL is as described above, 95 (that is, frp=95). The acquisition lens position fp' determined by the focus evaluation value acquiring timing determining processing is as follows:

Scfp[0]=fep'=109
Scfp[1]=fp'=107
Scfp[2]=fp'=105
Scfp[3]=fp'=101

Scfp[4]=fsp'=97

Here, the start lens position fsp' for acquiring the focus evaluation value FV is Scfp[4]=97.

Figure 9:
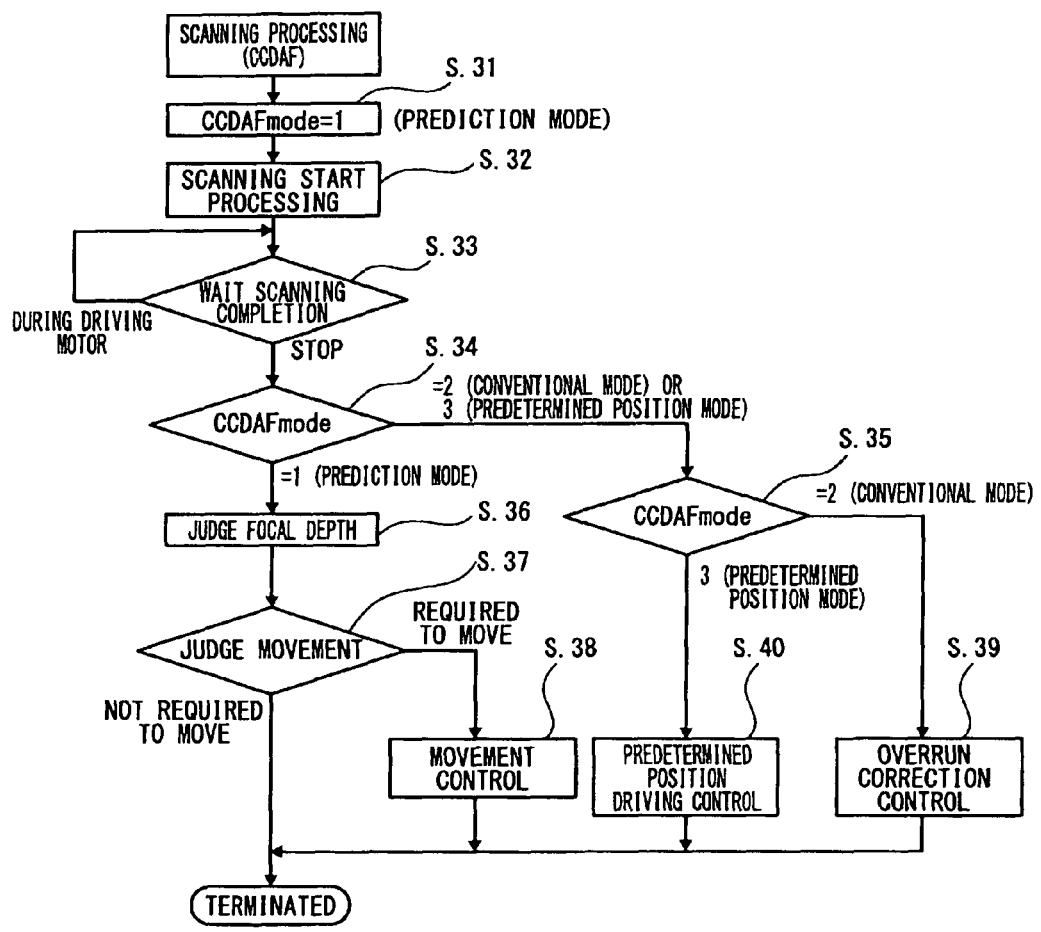
FIG. 9 is a flowchart of a scanning processing shown in FIG. 6.

In the scanning start processing (S.32) shown in FIG. 9, an initial excitation time t0 required for an initial excitation of the pulse motor is required at the present lens position frp=95.

In order to determine a driving speed of the pulse motor, a time in which the vertical synchronization signal VS every four pulses is acquired, a time in which the vertical synchronization signal VS every two pulses is acquired are required.

Then, considering the initial excitation time t0 and the time in which the vertical synchronization signal VS is acquired, the CPU 8 calculates a timing for acquiring the focus evaluation value FV in each lens position fp and sets an interrupt timer after the initial excitation at the timing synchronized with the vertical synchronization signal VS.

After the CPU 8 sets the start lens position fsp', the intermediate lens position fp' and the end lens position fep', the CPU 8 permits the motor control interrupt processing.

In the motor control interrupt processing, the interrupt is generated at the initial excitation time t0 and then the timer interrupt is generated at an interval based on the driving speed. Thereby, the pulse motor is driven every one pulse. The motor control interrupt processing refers again to the driving parameters set by the other processing every interrupt. Thereby, the driving speed of the pulse motor, the end lens position fep' where the focus lens is to be stopped are appropriately switched.

Figure 11:
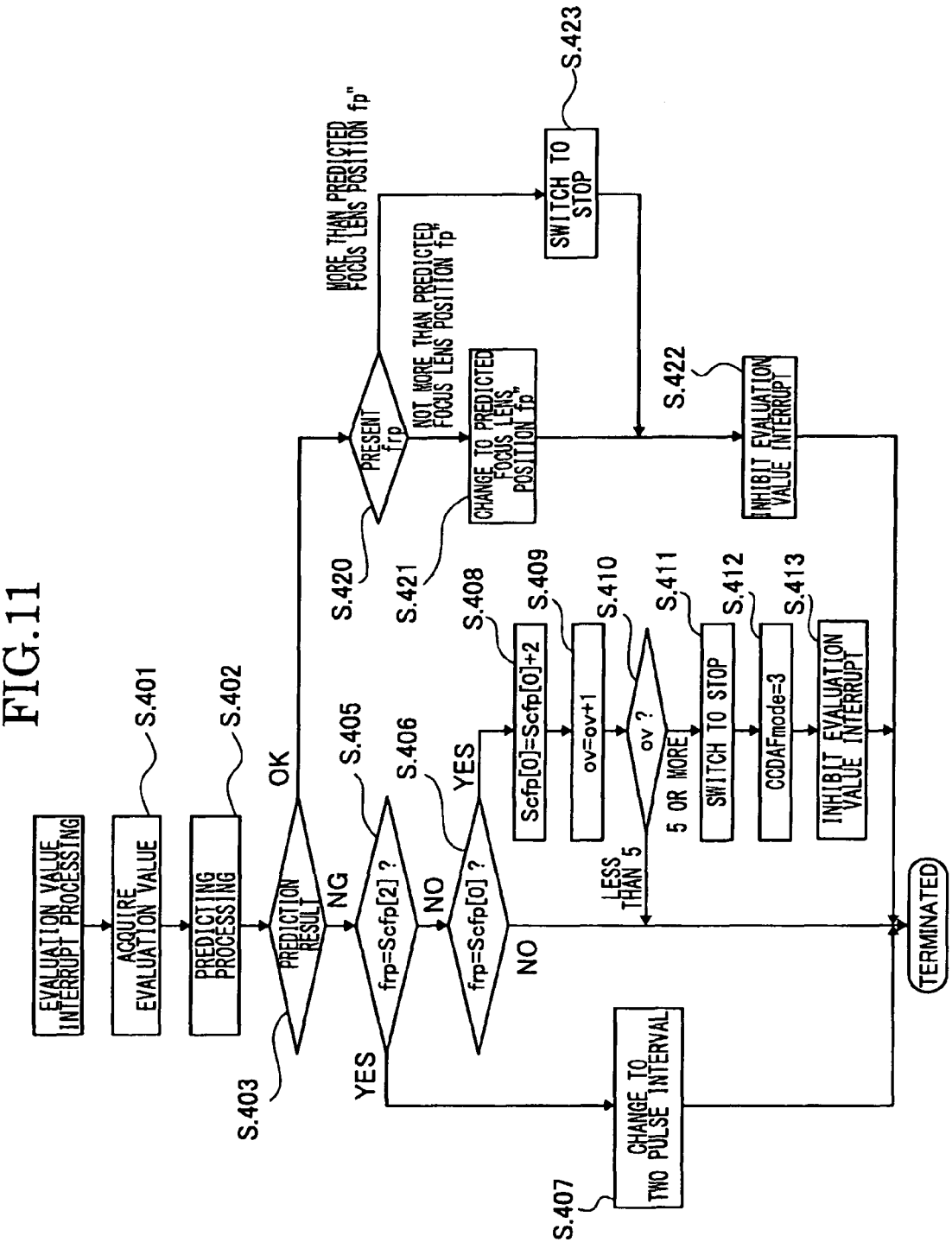
FIG. 11 is a flowchart of an evaluation value interrupt processing shown in FIG. 5.

The scanning start processing permits the evaluation value interrupt processing (predicted focus lens position determining device) shown in FIG. 11. The focus evaluation value FV is acquired, for example, as follows.

The digital still camera processor section 5 performs three tap digital filter processing of −½, 1, ½ on the brightness data of digital pixel data of the image signal in a horizontal scanning direction during the pulse motor driving processing to detect a high frequency component.

The digital still camera processor section 5 accumulates output values acquired by the filtering processing over pixels occupying an area of ¼ of a center of a screen of the liquid crystal.

The generation of the focus evaluation value FV is completed at a timing of rising the vertical synchronization signal VS, and then the evaluation value interrupt processing shown in FIG. 11 is started at the timing shown in FIG. 10.

At first, the focus evaluation value generated in S.401 is acquired.

Then, the later-described predicting processing in S.402 is performed. If a prediction is OK, that is, a predicted focus lens position fp" is acquired in the predicting processing, the processing flow moves to S.420 and the present lens position frp is compared with the predicted focus lens position fp". If the present lens position frp is not more than the predicted focus lens position fp", the processing flow moves to S.421 and a target position where the focus lens is to be stopped is changed to the predicted focus lens position fp". The processing flow moves to S.422 and an evaluation value interrupt inhibit processing for inhibiting the evaluation value interrupt processing is performed to escape from the evaluation value interrupt processing and the processing flow returns to S.33.

In S.420, if the present lens position frp is more than the predicted focus lens position fp", the processing flow moves to S.423 and a lens stop switching processing for stopping the focus lens is performed. The processing flow moves to S.422 and the evaluation value interrupt inhibit processing is performed to escape from the evaluation value interrupt processing and the processing flow returns to S.33.

After the evaluation value interrupt inhibit processing is performed, the driving control of the focus lens is completed and then the processing flow escapes from the scanning processing stop waiting loop of S.33 shown in FIG. 9.

If the prediction is NG, that is, the predicted focus lens position fp" is not acquired by the predicting processing, it is judged whether or not the present lens position frp is the acquisition lens position fp' stored in the array Scfp[2] (S.405).

Hereinafter, a case where the prediction NG is repeated will be explained.

In S.405, if the present lens position frp is not the acquisition lens position fp' stored in the array Scfp[2], it is judged as "No".

Then, in S.406, it is judged whether or not the present lens position frp is the end lens position fep' stored in the array Scfp[0]. In S.406, if the present lens position frp is not the end lens position fep' stored in the array Scfp[0], it is judged as "No" and the evaluation value interrupt processing is completed. Then the processing flow returns to S.33 in FIG. 9 and the pulse motor is continuously driven.

Thereby, the present lens position frp of the focus lens fL is changed and the processings in the steps S.405 and S.406 in FIG. 11 are performed from Scfp[4] where the start lens position fsp'=97 shown in FIG. 10 is stored to Scfp[2] where the acquisition lens position fp'=105 is stored.

Thereby, the focus evaluation value FV with the four pulse interval is acquired and the focus evaluation values FV at the start lens position fsp'=97, the intermediate lens position fp'=101, and fp'=105 stored in Scfp[4], Scfp[3] and Scfp[2], respectively are acquired.

Then, the processing flow moves from the processing of S.33 in FIG. 9 to the next evaluation value interrupt processing, and then it is judged whether or not the present lens position frp is the intermediate lens position fp'=105 stored in Scfp[2] (see S.405 in FIG. 11). Here, in S.405, the present lens position frp is the lens position fp'=105 stored in the Scfp[2] and therefore it is judged as "Yes".

Thereby, a two-pulse interval changing parameter setting processing (S.407) is performed for setting a parameter to change the focus evaluation value acquiring processing using the four pulse interval to the focus evaluation value acquiring processing using the two pulse interval. Then, the processing flow returns to the processing of S.33 in FIG. 9 again, and the pulse motor is continuously driven. Thereby, the present lens position frp of the focus lens fL is changed from frp=105 to frp=107 and the focus evaluation value FV at the acquisition lens position fp'=107 stored in Scfp[1] is acquired.

Then, the present lens position frp of the focus lens fL is changed and the processing flow moves again to the evaluation value interrupt processing shown in FIG. 11. Then, in S.405, it is judged whether or not the present lens position frp is the acquisition lens position fp' stored in Scfp[2].

In S.405, the present lens position frp is 107 (that is, frp=107) and not the acquisition lens position fp=105 stored in Scfp[2], and therefore it is judged as "No" and the processing flow moves to S.406.

Also in S.406, the present lens position frp is 107 (that is, frp=107), and not the end lens position fep'=109 stored in Scfp[0] and therefore it is judged as "No". The processing flow returns to S.33 in FIG. 9, and the pulse motor is continuously driven.

Thereby, the present lens position frp of the focus lens fL is changed from frp=107 to frp=109. Thereby, the focus evaluation value FV at the end lens position fep' stored in the array Scfp[0] is acquired.

Then, the processing flow moves again to the evaluation value interrupt processing shown in FIG. 11. In S.405, the present lens position frp is 109 (that is, frp=109) and not the acquisition lens position fp'=105 stored in Scfp[2] and therefore it is judged as "No". The processing flow moves to S.406.

In S.406, the present lens position frp is compared with the value of Scfp[0], and if the present lens position does not run to the value of Scfp[0], the processing flow returns to S.33 in FIG. 9.

In S.406, if the present lens position frp is equal to the value of Scfp[0], since the prediction result in S.403 is not yet "OK", the value of Scfp[0] is updated after newly adding "+2" to the value Scfp[0] (S.408). Then, the processing flow moves to S.409, a not-illustrated ov value, which is set to zero when the scanning processing starts, is set to "+1".

Then, the processing flow moves to S.410, it is judged whether or not the ov value is "5" or more. Thereby, when the prediction result in the predicting processing is not "OK", the initial Scfp[0] is updated up to five times and then the lens position can be controlled.

If the prediction result is not yet "OK" after Scfp[0] is updated five times, the processing flow moves to S.411, the driving parameter of the pulse motor is changed so as to stop to drive the focus lens. Then, in S.412, CCDAFmode is set to 3 (that is, CCDAFmode=3) and the processing flow moves to S.413 to perform the evaluation value interrupt inhibit processing. After the evaluation value interrupt is inhibited, when the driving control of the focus lens is completed, the processing flow escapes the scanning processing stop waiting loop of S.33 in FIG. 9.

CCDAFmode=3 indicates a mode for driving the focus lens to a predetermined lens position if the prediction result in the predicting processing is not OK, and used when the processing flow moves to the predetermined position driving control processing for driving the focus lens to the predetermined position shown in S.40 in FIG. 9.

Furthermore, the predetermined lens position is used when the automatic focus detection cannot be performed and the lens position which is preliminarily determined based on a zooming position in a photographing device, and the like.

In S.403, if the prediction result is OK, and in S.420, if it is judged that the present lens position frp is not more than the predicted focus lens position fp", the processing flow moves to S.421. The driving parameters of the pulse motor are appropriately changed in the evaluation value interrupt processing and the driving of the pulse motor is changed so as to position the focus lens fL to the predicted focus lens position fp". When the motor driving control is terminated, the scanning processing shown in FIG. 9 (CCDAF) is terminated.

In the scanning processing in FIG. 9, after the pulse motor is stopped to be driven, it is confirmed whether or not a focus prediction scanning mode is set (S.34). In S.34, if CCDAFmode=1, it is judged that the focus lens fL is positioned at the predicted focus lens position fp".

If CCDAFmode=2, the focus prediction scanning mode is canceled and it is judged that the focus lens fL is positioned at the lens position fp which exceeds a lens position having the peak value FVp of the focus evaluation values FV.

Then, in S.39, as conventionally, the overrun correction control processing of the focus lens fL is performed to return the focus lens fL to the optimum focus lens position fbp corresponding to the lens position having the peak value FVp of the focus evaluation values FV.

If CCDAFmode=3, in S.40, the focus lens IL is controlled to be driven to the predetermined lens position.

The predicting processing according to an embodiment of the present invention will be explained with reference to FIGS. 10 to 13.

The image pickup device 3 is exposed every vertical synchronization signal VS and the data transfer processing of the image pickup device 3, the focus evaluation value generating timing processing, and the focus evaluation value interrupt processing are performed for a transferring period from when the present vertical synchronization signal VS is generated to when the next vertical synchronization signal is generated.

Since the present lens position frp is 95 and the target lens position AFfp is 109, the acquisition lens position fp' determined by the focus evaluation value acquiring timing determining processing shown in FIG. 7 is stored in the following Scfp[ ].

Scfp[0]=fep'=109
Scfp[1]=fp'=107
Scfp[2]=fp'=105
Scfp[3]=fp'=101
Scfp[4]=fsp'=97

In the scanning processing shown in FIG. 9, a driving control of the pulse motor is started such that the acquisition lens position fp' for acquiring a focus evaluation value of Scfp[ ], which is acquired by the focus evaluation value acquiring timing determining processing is matched with a timing of rising the vertical synchronization signal VS. The focus evaluation value FV is generated in synchronization with the timing of rising the vertical synchronization signal VS.

In synchronization with the timing of generating the focus evaluation value FV, the evaluation value interrupt processing shown in FIG. 11 is performed.

In the evaluation value interrupt processing shown in FIG. 11, when the present lens position frp of the focus lens fL reaches the acquisition lens position fp" stored in Scfp[2], a switching processing from the four-pulse interval lens driving processing to the two-pulse lens driving processing is performed. Furthermore, in the interrupt processing, the predicting processing for calculating the predicted focus lens position fp" is performed.

Here, the predicting processing will be explained. The CPU 8 has a function as a predicted focus lens position predicting device.

Figure 12:
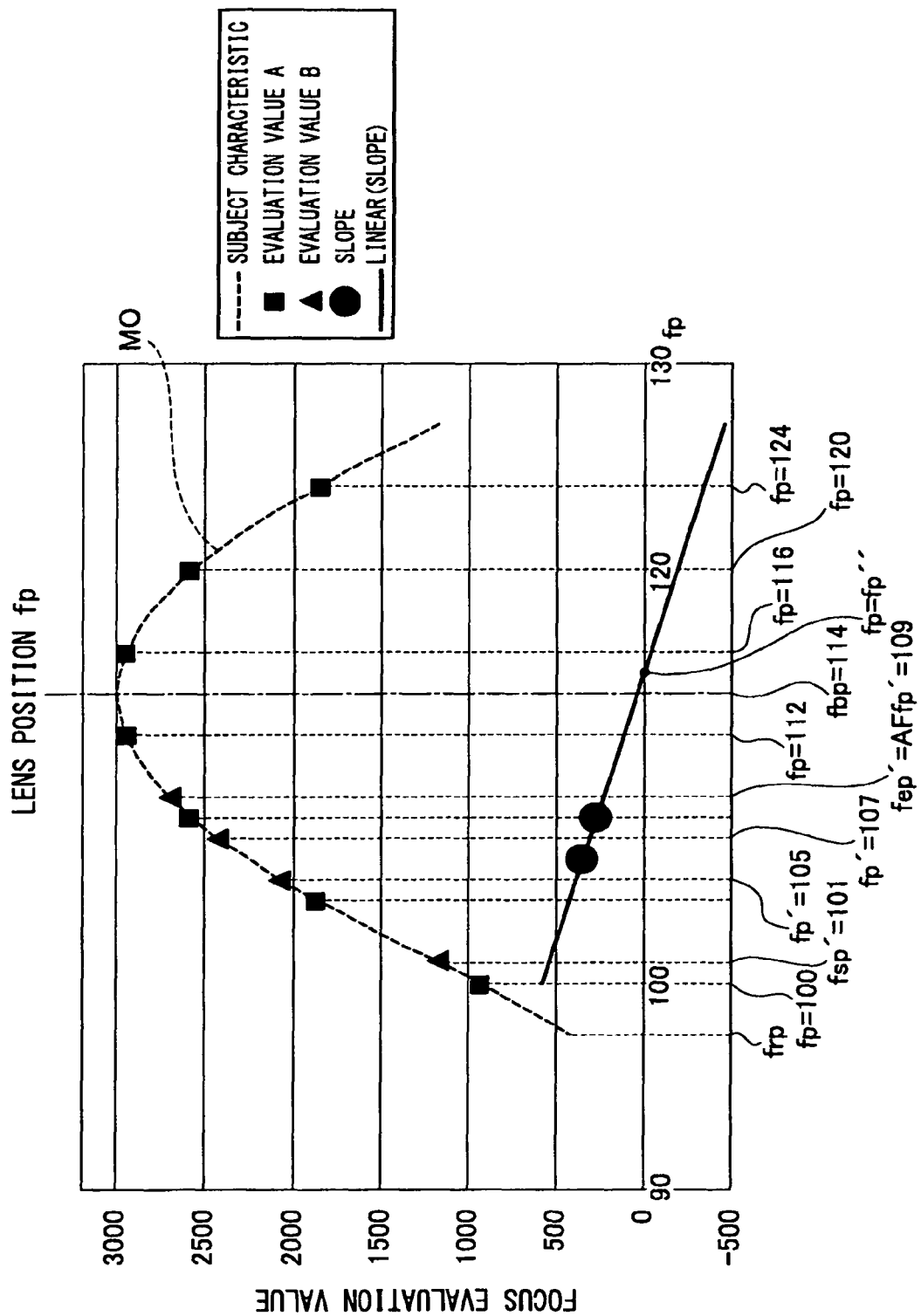
FIG. 12 is a graph showing a relationship between an optimum focus lens position acquired by the conventional peak value scanning system and a predicted focus lens position acquired by a scanning system according to an embodiment of the present invention.

FIG. 12 is a graph showing a relationship between the lens position fp and the focus evaluation value FV when the scanning processing is performed. Here, the lens position fp is used as a lens position including the present lens position frp, the start lens position fsp', the end lens position fep', the intermediate lens position fp' between the start lens position fsp' and the end lens position fep', the target lens position, the optimum focus lens position fbp, and the predicted focus lens position fp".

In FIG. 12, broken line indicates a characteristic curve MO having a mountain shape of the focus evaluation values FV acquired on the assumption that the focus lens fL can be set to the lens position fp in the optical axis direction by controlling the focus lens fL in a nonstep manner to the subject. It is also shown as the characteristic curve in a case where the focus lens fL is in a defocused state to the subject.

However, in fact, the lens position fp of the focus lens fL is controlled not with the non step control but also stepwise controlled with a stepwise control by the pulse motor, and a control capability of the focus lens fL is finite.

Accordingly, in the digital still camera, sampling of the focus evaluation value information is performed only at the discretely separated lens positions fp. Based on the information f the discretely acquired focus evaluation values FV, the characteristic curve MO of the focus evaluation values FV can be acquired.

A determining method for determining the predicted focus lens position fp" according to this Example is explained with reference to an example compared to the conventional determining method for determining the optimum focus lens position fbp.

The lens position fp based on the ranging result acquired by ranging sensor 14 ranging from the digital still camera to the subject, that is, the target lens position AFfp is 109 (that is, AFfp=109) as described above.

The ranging accuracy of the ranging sensor 14 is, for example, in a case of the triangulation method, a fixed accuracy determined by a base-line length and a focal length of an automatic focus (AF) optical system. Accordingly, the ranging accuracy is not sufficient for a telephoto lens, and the like.

Considering a deviation due to error in the ranging accuracy, it is effective to search the optimum focus lens position fbp at the lens positions at the vicinity of the ranging result of the ranging sensor 14.

For example, in terms of the lens position fp, if the ranging error corresponds to, for example, about 8 pulses, it is effective to search the optimum focus lens position fbp for 10 pulses considering the ranging errors.

That is, even in the conventional scanning processing for scanning the peak value, if the scanning is started from, for example, fp=100, the optimum focus lens position fbp can be effectively searched even when the ranging error by the ranging sensor exists.

Considering the focal depth condition of the focus lens fL, the focus evaluation values FV are acquired with four-pulse intervals while the focus lens is driven from the lens position fp=100 to a ranged distance AFfp=109.

Here, in the conventional peak value scanning processing, when the peak value FVp of the focus evaluation values FV is detected, in order to avoid error detection of the peak value FVp based on influence of noise due to the circuits of the digital still camera and noise due to the photographing image, it is judged that there is no detection error in the detection of the peak value FVp of the focus evaluation values FV, if the focus evaluation value FV acquired at this time is smaller than the focus evaluation value FV acquired at the previous time and when a focus evaluation value FV to be acquired at the next time is set as the focus evaluation value FV acquired at the present time, the focus evaluation value FV acquired at the present time is smaller than the focus evaluation value FV acquired prior to the previous time.

Accordingly, as shown in FIG. 12, if the optimum focus lens position fbp is positioned at an intermediate position between fp=112 and fp=116, the focus evaluation value FV is acquired at least three times after the focus lens fL exceeds the optimum focus lens position fbp=114.

That is, in the conventional peak value scanning processing, if the start lens position fsp' is fp=100, the focus evaluation values FV are acquired at seven lens positions fp of fp=100, 104, 108, 112, 116, 120, and 124. Here, the lens position fp=124 is the end lens position fep'. The focus evaluation values FV acquired as described above are shown by filled square in FIG. 12.

Here, for example, the focus evaluation values FV are, as shown in FIG. 13, FV=927 at the lens position fp=100, FV=1870 at the lens position fp=104, FV=2575 at the lens position fp=108, FV=2951 at the lens position fp=112, FV=2951 at the lens position fp=116, FV=2575 at the lens position fp=120, and FV=1871 at the lens position fp=124.

Then, the CPU 8 calculates the hill-shaped characteristic curve MO by a well-known interpolating operation based on each of the focus evaluation values FV discretely acquired between the lens position fp=100 to the lens position fp=124. The CPU 8 calculates the peak value FVp of the focus evaluation values FV from the characteristic curve MO and calculates the optimum focus lens position fbp from the peak value FVp. Here, the optimum focus lens position fbp is 114 (that is, fbp=114).

Figure 3:
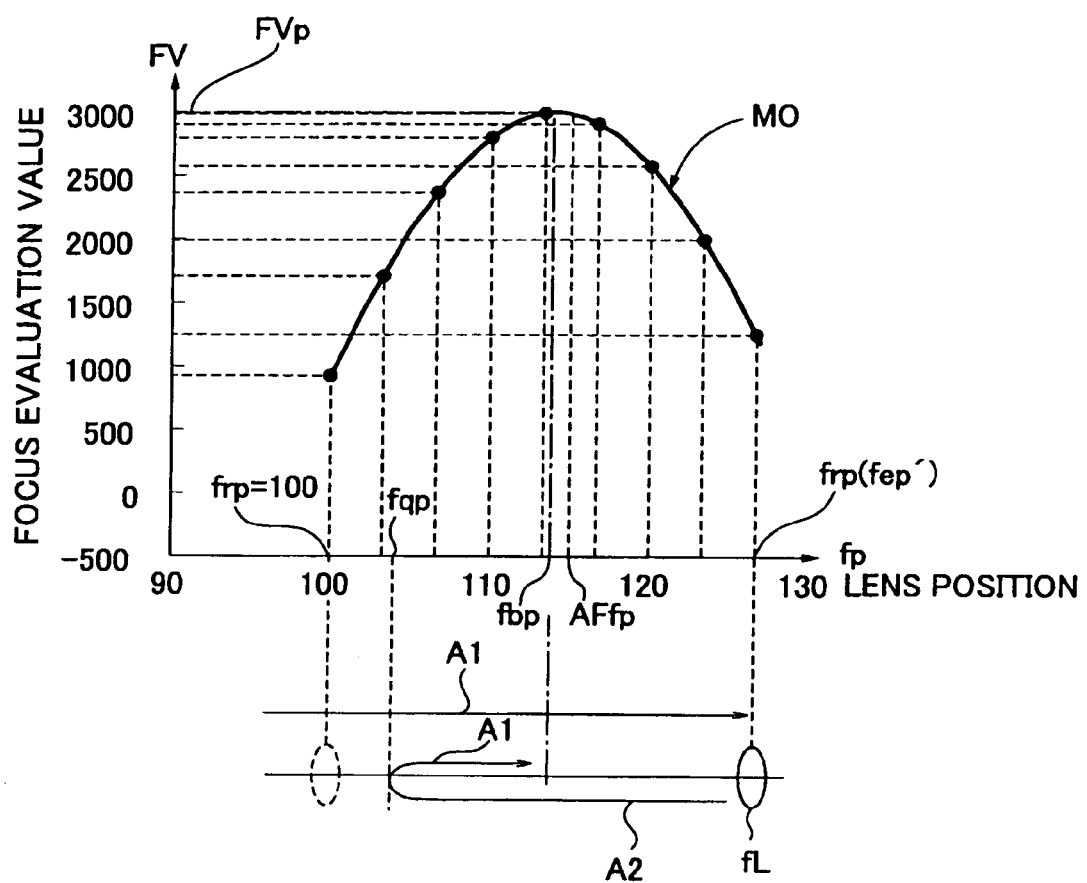
FIG. 3 is an explanatory view schematically showing procedures to complete focusing of a focus lens by the conventional peak value scanning system.

In the conventional peak value scanning processing, as schematically explained by using the conventional one with reference to FIG. 3, the focus lens fL is driven until the focus evaluation value FV exceeds the peak value FVp. Accordingly, in order to acquire the subject image without defocus, after once the focus lens fL is driven in a reverse direction, the focus lens fL is driven again in a normal direction to be positioned at the optimum focus lens position fbp.

Figure 2:
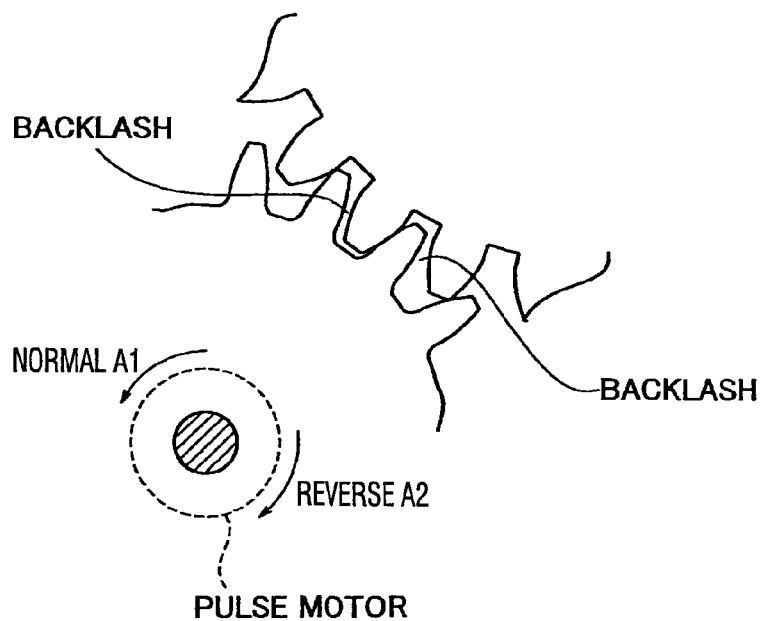
FIG. 2 is an explanatory view schematically showing a backlash existing in a mechanical driving mechanism.

However, in the mechanical driving mechanism of the focus lens fL, as schematically shown in FIG. 2, driving errors due to backlash occur. If the focus lens fL is driven in a direction of arrow A1 to calculate the peak value FVp of the focus evaluation values FV, the driving errors due to backlash occur when the focus lens fL is driven in a direction of arrow A2 reverse to the direction A1.

That is, on the assumption that the focus lens fL is driven in a normal direction from fp=100 to fp=124, if the focus lens fL is driven in the reverse direction from fp=124 to fp=100, driving errors due to backlash occur.

Accordingly, when the focus lens fL is returned to the optimum focus lens position fbp from fp=124 to fp=114, even if the focus lens fL is driven by 10 pulses in a direction toward the original position, the focus lens fL cannot be positioned at the optimum focus lens position fbp.

In this case, it is considered to preliminarily calculate the error amount due to backlash in terms of a pulse number, increase or decrease the calculated pulse number as the fixed difference to or from a pulse number corresponding to the difference between the end lens position fep' and the optimum focus lens position fbp and then determine the driving pulse number for actually driving the pulse motor in the reverse direction.

However, in the mechanical driving mechanism, there are various accuracies such as accuracy in parts of the pulse motor constituting the driving mechanism, accuracy in parts of gears, assembling accuracy. Accordingly, it is difficult to deal with the calculated pulse number as the fixed difference corresponding to errors due to backlash.

That is, the focus lens fL is driven in the optical axis direction in order of several micrometers for one pulse. Accordingly, if there is backlash of 0.01 mm, the error due to backlash corresponds to several pulses. Then, if a backlash amount changes due to part accuracy and assembling error, the pulse number also largely changes due to the changed amount in terms of pulse number, so that the pulse number cannot be used as the fixed difference.

Accordingly, in order to eliminate the error occurring in the lens position fp due to backlash, as shown in FIG. 3, the focus lens fL is driven in the scanning direction (A1 direction) from the present lens position frp and driving of the pulse motor is once stopped at the end lens position fep'.

Then, the pulse motor is excited and the focus lens fL is driven in the reverse direction (A2 direction) from the end lens position (lens stop position) fep' by sum of the pulse number corresponding to the difference between the end lens position fep' and the optimum focus lens position fbp and the pulse number corresponding to the error due to backlash, and then driving of the pulse motor is stopped. Thereby, the focus lens fL is stopped at a corrected lens position fqp.

Then, the pulse motor is excited again and the focus lens fL is driven from the corrected lens position fqp to the optimum focus lens position fbp in the A1 direction.

In a case of this example, on the assumption that the error amount due to backlash corresponds to "8" pulses, the focus lens IL is returned in the reverse direction (A2 direction) by a sum of the pulse number of 10 corresponding to the difference between the end lens position (last lens position) fep'=124 and the optimum focus lens position fbp=114 and the pulse number of 8 corresponding to the error due to backlash.

In the conventional example, a time required for completing focusing from the present lens position frp=100 is 194 ms in total, as described hereinafter.

At first, it is assumed that an interval between the vertical synchronization signals is 16 ms. The time required for acquiring one focus evaluation value FV is, as shown in FIG. 10, 16 ms as a maximum. As shown in FIG. 13, seven focus evaluation values FV are acquired every four pulses between the present lens position frp=100 to the end lens position fep'=124.

Accordingly, a time required for acquiring the focus evaluation values FV with the four-pulse interval within a time between the present lens position frp=100 to the end lens position fep'=124 including a time required for acquiring the first focus evaluation value at the present lens position frp=100 is 7×16 ms=112 ms. The driving speed of the focus lens fL is 16 ms to the four lens positions fp and therefore a time required for changing one lens position fp is 4 ms. It is assumed that a stop excitation time t0 is 10 ms.

It is assumed that the focus lens fL is driven in the reverse direction (A2 direction) by a sum of the pulse number of 10 corresponding to the pulse number from the end lens position fep'=124 to a lens position over the optimum focus lens position fbp=114 and the pulse number of 8 corresponding to backlash at the driving speed of 2 ms. That is, the driving speed of the focus lens fL is larger than the driving speed when acquiring the focus evaluation value.

In this case, a time required for returning the focus lens fL from the end lens position fep'=124 to the corrected focus lens position fqp=106 is 18 pulses×2 ms=36 ms. The stop excitation time t0 is 10 ms.

Then, a time required for driving the focus lens fL from the corrected lens position fqp=106 to the optimum focus lens position fbp=114 is 8 pulses×2 ms=16 ms, and the stop excitation time t0 is 10 ms.

Accordingly, the time required for completing a focusing from the present lens position frp=100 is 194 ms in total.

On the contrary, a time for predicting a focusing by driving the focus lens fL from the present lens position frp to the predicted focus lens position fp" by the automatic focusing control apparatus according to an embodiment of the present invention as well as a principle thereof will be explained hereinafter.

The start lens position fsp', the intermediate lens position fp' and the end lens position fep' determined by the focus evaluation value acquiring timing determining processing (see FIG. 7) based on the present lens position frp=100 and the target lens position AFfp=109 are as follows:
  fsp'=101
  fp'=105
  fp'=107
  fep'=109
In FIG. 12, the focus evaluation values FV at the acquisition lens positions (the start lens position, the intermediate lens position, and the end lens position) fsp', fp' and fep', respectively, are indicated by a triangles.

The focus evaluation value FV is 1179 (that is, FV=1179) at fsp'=101, FV is 2073 (that is, FV=2073) at fp'=105, FV 2427 is (that is, FV=2427) at fp'=107 and FV is 2703 (that is, FV=2703) at fep'=109, and in FIG. 13, a relationship between the acquisition lens positions fp' and the focus evaluation values FV acquired at each of the acquisition lens positions fp' is shown.

A slope of the evaluation values is calculated at each acquisition lens position.

As shown in FIG. 13, from the focus evaluation value FV=2073 at the acquisition lens position fp'=105 and the focus evaluation value FV=1179 at the previous acquisition lens position fp'=101, a difference value "894" for four pulses is calculated. The lens position fp is normalized using the two-pulses interval, and therefore a slope value at a virtual lens position fp'=103 is calculated by dividing "894" by "2" and then the slope of "894"/2="447" is acquired.

Next, from the focus evaluation value FV=2427 at the acquisition lens position fp'=107 and the focus evaluation value FV=2073 at the previous acquisition lens position fp'=105, a difference value "354" is calculated. The lens position fp has one pulse interval, and therefore a slope value at a virtual lens position fp'=106, that is, the slope of "354" is acquired.

Next, from the focus evaluation value FV=2073 at the acquisition lens position fp'=109 and the focus evaluation value FV=2427 at the previous acquisition lens position fp'=107, a difference value "276" is calculated. The lens position fp has one pulse interval, and therefore a slope value at a virtual lens position fp'=108, that is, the slope of "276" is acquired.

If the acquired slopes, as described above, that is, 447, 354, and 276 indicate two decreased values in series, the predicting processing is to perform the focus predicting processing by use of the two decreased values of the acquired slopes, that is, 354, and 276.

The differences between the focus evaluation values FV are shown by filled circles in FIG. 12. A linear interpolation formula is calculated by use of the difference value "354" of the focus evaluation value FV at the lens position fp'=107 and the difference value "276" of the focus evaluation value FV at the end lens position fep'=109. By calculating a lens position fp where the difference value is calculated as 0 by the linear interpolation formula, the predicted focus lens position fp" close to the optimum focus lens position fbp=114 can be acquired.

This is because the closer to the optimum focus lens position fbp the lens position is, the closer to "0" the difference value of the focus evaluation value FV acquired at the acquisition lens position fp' is.

However, if the difference between the two decreased values, that is, two data when the slopes are decreased twice in series is small, error in the lens position fp calculated by the linear interpolation formula is large.

Here, a decreased ratio of the two decreased data is defined by: (second decreased data)/(first decreased data)×100(%). In this example, "276"/"354"×100=78(%)

Based on the decreased ratio, the lens position fp calculated by the linear interpolation formula is corrected.

Figure 15:
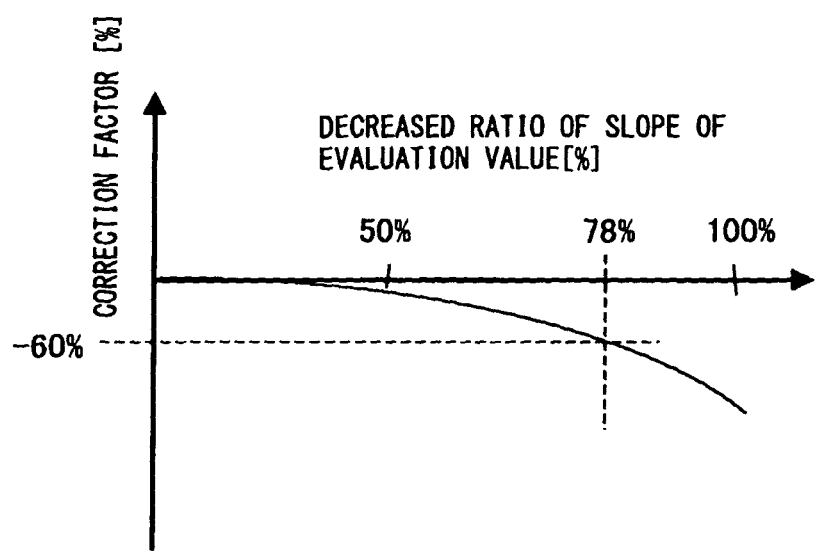
FIG. 15 is a correction factor characteristic curve according to an embodiment of the present invention.

The correction is performed by use of a correction ratio characteristic curve shown in FIG. 15.

A correction input value is the decreased ratio of the slope and a correction output value is a correction ratio to a number of a pulse interval for acquiring the evaluation value. If the decreased ratio is 0%, the slope of the second decreased data is almost zero, and the lens position calculated by the linear interpolation formula by use of the first and second decreased data has the slope of zero (no slope), that is, indicates a peak of the hill shape of the characteristic curve of the evaluation values and no correction is performed.

On the other hand, if the decreased ratio is large, the lens position of the second decreased data is far from the lens position having the slope of zero and the lens position calculated by the linear interpolation formula may have large error so that large correction is required.

In this example, the decreased ratio is 78% and the correction factor is −60% based on the correction factor characteristic curve.

A pulse number to be corrected is calculated by use of the pulse interval "2" and the correction factor −60(%) acquired by FIG. 15, that is, −0.6×2=−1.2 (pulses).

The lens position of 115 calculated by the linear interpolation formula is corrected, and therefore the corrected lens position of "115"−1.2=113.8 is acquired.

As described above, the predicted focus lens position fp" is 114 (fp"=114) and the lens position matched with the optimum focus lens position fbp can be acquired.

In this example, the lens position of 109, that is, the lens position at a close side is used for acquiring the predicted focus lens position fp". However, according to the hill shape of the evaluation values depending on the subject, it is possible that the focus lens is already driven over the lens position when the predicted focus lens position fp" is acquired.

In FIG. 9, after scanning is completed, in a case where CCDAFmode is 1, a focal depth judging processing for judging a focal depth is performed.

Particularly, the focal depth range where the focus lens is apparently in a focusing state by an F value is previously stored in the photographing apparatus. The lens position where the focus lens is stopped after the predicted focus lens position fp" is acquired is compared with the predicted focus lens position fp".

If the lens position where the focus lens is stopped is within the focal depth range where the focus lens is apparently in a focusing state relative to the predicted focus lens position fp", the focus lens is not required to be moved. Therefore, in the movement judging in S.37, it is judged that the focus lens is not required to be moved.

If the lens position where the focus lens is stopped is not within the focal depth range where the focus lens is apparently in a focusing state relative to the predicted focus lens position fp", the focus lens is required to be moved. Accordingly, in the movement judging in S.37, it is judged that the focus lens is required to be moved and therefore the focus lens is controlled to be moved to the predicted focus lens position fp".

According to an example of the present invention, a time required for driving the focus lens fL from the start lens position fsp'=101 to the predicted focus lens position fp", that is, a time required for completing the focusing is 86 ms.

Hereinafter, the time required for completing the focusing will be explained.

The focus evaluation values FV are acquired twice while the focus lens is driven from the start lens position fsp'=101 to the acquisition lens position fp'=105. The time required for acquiring one focus evaluation value FV is 2×16 ms=32 ms.

Then, since the focus evaluation values are acquired twice in total with the two-pulse interval while the focus lens is driven from the acquisition lens position fp'=105 to the end lens position fep'=109, the time required for acquiring the focus evaluation values FV from the acquisition lens position fp'=105 to the end lens position fep'=109 is 2×16 ms=32 ms.

Since the focus lens fL is driven to change two acquisition lens positions fp for 16 ms, the driving speed of the focus lens requires 8 ms to change one acquisition lens position fp. Accordingly, the driving speed is lower than a driving speed in a case where the focus evaluation values FV are acquired every four pulses.

Then, a time required for driving the focus lens from the end lens position fep'=109 to the predicted focus lens position fp"=115 is 6 pulses×2 ms=12 ms. The stop excitation time of the pulse motor is 10 ms. Accordingly, a total driving time of the focus lens fL is 86 ms.

As clearly described in the above compared examples, compared to the time required for completing a focusing from the scanning start by the conventional peak value scanning method, according to the scanning of an example of the present invention, the time required from a scanning start to a scanning completion is short.

After completing the focusing, the processing flow returns to the main processing in FIG. 6, and moves to S.9 to perform the switch state judging processing. If the first switch SW1 is turned on, the processing flow moves to S.10 and if the second switch SW2 is turned on, the processing flow moves to S.11.

In S.10, if the first switch SW1 is turned on, the processing flow returns to S.9 to repeat the switch state judging processing and when the first switch SW1 is turned off, the processing flow returns to S.1 to repeat the main processings.

In S.11, a photographing is performed and after the still image recording processing is performed, the processing flow returns to S.1 to perform the main processings.

In this example, the focus evaluation value generating device generates the focus evaluation value based on the image data acquired through the focus lens to determine the focus lens position to the subject, the target lens position determining device determines the target lens position as a target to perform the focusing operation by driving the focus lens, the focus evaluation value acquiring timing determining device determines a plurality of acquisition lens positions each for acquiring the focus evaluation value in a direction from the present lens position of the focus lens toward a position where the target lens position exists, and the scanning device drives the focus lens in the optical axis direction and in a direction from the present lens position toward the position where the target lens position exists to acquire the focus evaluation value at each of the acquisition lens positions. The predicted focus lens position determining device predicts a focus lens position based on the focus evaluation values and if the predicted focus lens position is determined, the moving device stops the scanning device to drive the focus lens, and to drive the focus lens in the same direction as the direction where the focus lens is driven by the scanning device to move the focus lens to the predicted focus lens position.

The predicted focus lens position determining device corrects the predicted focus lens position based on the decreased ratio calculated by slopes of the focus evaluation values to determine the corrected focus lens position as the predicted focus lens position.

Example 2

Generally, if the difference between the predicted focus lens position fp" and the target lens position AFfp is large, the focusing accuracy of the focus lens fL to the subject is low.

For example, if the subject has low contrast or low brightness, the focus evaluation value FV acquired at each acquisition lens position for acquiring the focus evaluation value includes noise so that an accuracy of the focus evaluation values FV is degraded.

Accordingly, an accuracy of the predicted focus lens position fp" is degraded. As a result, the focusing accuracy of the focus lens fL to the subject is decreased.

For example, during calculating the predicted focus lens position fp" after ranging a distance to the subject, if the subject is moved from a position having the ranged distance, the focusing accuracy of the focus lens fL to the subject may be degraded.

Further, the ranging accuracy of the ranging sensor 14 may be low. Since each acquisition lens position fp' is determined based on the target lens position AFfp by the ranging sensor 14, when the accuracy of the ranging sensor is low, the finally acquired predicted focus lens position fp" has low accuracy.

In the above described cases, as conventionally, it is preferable that a so-called climbing type scanning method is used, in which the pulse motor drives the focus lens fL in one direction, the focus evaluation value FV is acquired at each of the acquisition lens positions fp' discretely set with an even interval from the start lens position fsp', it is judged twice whether the difference between the focus evaluation value FV at the present time and the focus evaluation value FV at the previous time is "+" (positive) or "−" (negative) to detect a peak of the focus evaluation values FV, if the two judging results are "−", it is judged that the lens position exceeds a position having the peak. Here, it is preferable that scanning of the focus lens fL is stopped when the judging result of "−" is acquired twice in series.

That is, in the scanning processing during performing the prediction mode, if the focus evaluation value FV acquired at the acquisition lens position fp' is smaller than a predetermined value, since the finally acquired predicted focus lens position fp" has low reliability, it is preferable to change the scanning processing from the prediction mode to the conventional mode during the scanning processing while performing the prediction mode.

Figure 14:
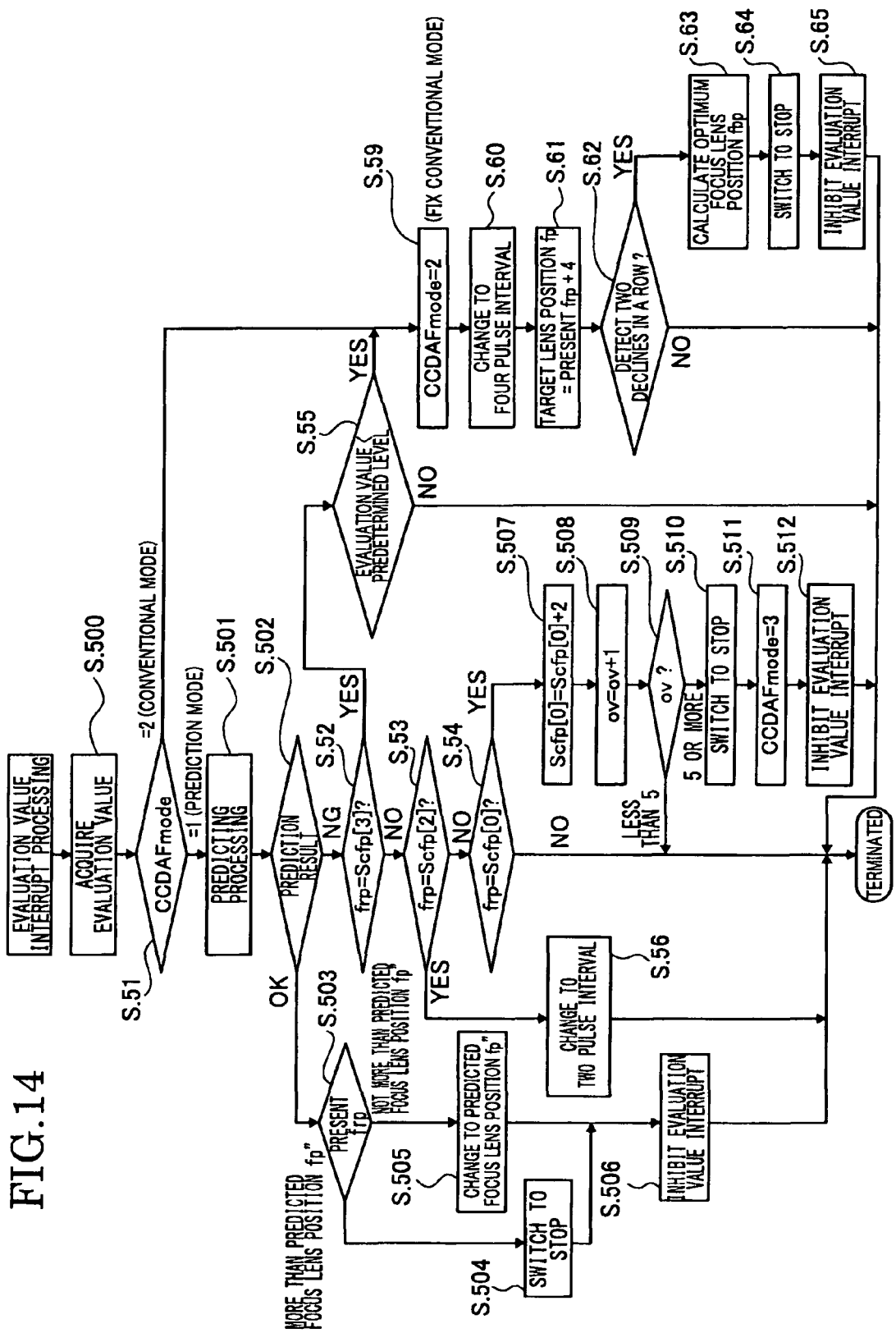
FIG. 14 is a flowchart for explaining another example of the evaluation value interrupt processing shown in FIG. 11

FIG. 14 is a flowchart showing an example of the evaluation value interrupt processing including a reliability judging processing (judging device) for judging the reliability of the predicted focus lens position fp" and a mode switching processing.

When the processing flow enters the evaluation value interrupt processing, the CPU 8 loads the evaluation values in S.500 and judges whether or not the scanning mode CCDAFmode is 1 (CCDAFmode=1) (S.51).

If CCDAFmode=1, the predicting processing is performed in S.501, and if the prediction result is NG in S.502, it is judged whether or not the present lens position frp is the acquisition lens position fp' stored in the array Scfp[3] (S.52). If the present lens position frp is not the acquisition lens position fp' stored in the array Scfp[3], it is judged as "No" and then it is judged whether or not the present lens position frp is the acquisition lens position fp' stored in the array Scfp[2] (S.53).

If the present lens position frp is not the acquisition lens position fp' stored in the array Scfp[2], it is judged as "No", and the it is judged whether or not the present lens position frp is the end lens position fep' stored in the array Scfp[0] (S.54).

If the present lens position frp is not the end lens position fep' stored in the array Scfp[0], it is judged as "No", and the processing flow returns to S.33 in FIG. 9.

If CCDAFmode=1, if the prediction result is NG in S.502, the processings of S.51 to S.54 are repeated until the focus evaluation value FV at the acquisition lens position fp' stored in the array Scfp[3] is acquired.

If the prediction result is OK in S.502, the processing flow moves to S.503 and the present lens position frp is compared with the predicted focus lens position fp". If the present lens position frp does not exceed the predicted focus lens position fp", the processing flow moves to S.505 and the target position where the focus lens is to be stopped is changed to the predicted focus lens position fp". Then, the processing flow moves to S.506 to perform the evaluation value interrupt inhibit processing and the processing flow escapes from the evaluation value interrupt processing and returns to S.33.

If the present lens position frp already exceeds the predicted focus lens position fp" in S.503, the processing flow moves to S.504 and a lens stop switching processing for stopping the focus lens is performed. Then the processing flow moves to S.506 to perform the evaluation value interrupt inhibit processing and then the processing flow escapes from the evaluation value interrupt processing and returns to S.33.

After the evaluation value interrupt is inhibited, when driving control of the focus lens is completed, the processing flow escapes from the scanning processing stop waiting loop of S.33 in FIG. 9.

If the present lens position frp is the lens position fp' stored in the array Scfp[3] in S.52, it is judged as "Yes", and the processing flow moves to S.55 and it is judged whether or not the focus evaluation value FV acquired at the present lens position frp is smaller than the predetermined value.

That is, if the focus evaluation value FV at the acquisition lens position fp' stored in the array Scfp[3] is equal to or more than the predetermined value, it is judged as "No" and the processing flow returns to S.33 in FIG. 9.

Here, the focus evaluation value FV at the acquisition lens position fp' stored in the array Scfp[3] is used as the predetermined value. This is because, if the focus evaluation value FV at the acquisition lens position fp' stored in Scfp[3] is a predetermined level or less, a contrast component of the subject is small even at the vicinity of the optimum focus lens position fbp.

It is possible to use a configuration in which if the brightness of the subject acquired during the AE processing just before performing the scanning processing (CCDAF processing) is less than the predetermined brightness, CCDAFmode is set to 2 (CCDAFmode=2) and the conventional peak scanning method is performed.

It is possible to use a configuration in which, as a result of the noise judging, if the noise is larger than the predetermined value, CCDAFmode is set to 2 (CCDAFmode=2) and the conventional peak value scanning method is performed. In the noise judging, for example, it is judged that the changing direction is an increased direction if the difference between the focus evaluation value FV acquired at this time and the focus evaluation value FV acquired at the previous time is "+" and the changing direction is a decreased direction if the difference between the focus evaluation value FV acquired at this time and the focus evaluation value FV acquired at the previous time is "−". If the changing direction acquired at the present time is different from the changing direction acquired at the previous time, "+1" is counted as a count and then an index value m/M indicating noise amount, where m is a sum of the counted values as a numerator and M is an acquired number of acquiring times of the focus evaluation values as a denominator.

By performing the processings of S.51 to S.55 as the focus lens fL is moved from the present lens position frp to the end lens position fep', the focus evaluation value FV at the start lens position fsp' stored in Scfp[4] and the focus evaluation value FV at the acquisition lens position fp' stored in Scfp[3] in the predicting processing are acquired.

In the scanning processing, the present lens position frp of the focus lens fL reaches the acquisition lens position stored in the array Scfp[2], and then the focus evaluation value at the acquisition lens position stored in the array Scfp[2] is acquired.

If the present lens position frp of the focus lens fL is the acquisition lens position fp' stored in the array Scfp[2], it is judged as "No" in S.52 and then the processing flow moves to S.53.

In S.53, since the present lens position frp of the focus lens fL is the acquisition lens position fp' stored in the array Scfp[2], it is judged as "Yes", and the processing flow moves to S.56.

In S.56, the switching processing for changing the focus evaluation value acquiring processing using the four-pulse interval to the focus evaluation value acquiring processing using the two-pulse interval is performed. Then, the processing flow returns to the scanning processing.

In the scanning processing, when the focus evaluation value FV at the acquisition lens position fp' stored in the array Scfp[1] is acquired, it is judged as "No" in S.54, and the processing flow returns to the scanning processing via S.51 to S.54.

In the scanning processing, the present lens position frp of the focus lens fL is continuously changed and when the focus evaluation value FV at the end lens position fep' stored in the array Scfp[0] is acquired, it is judged as "Yes" in S.54.

In S.54, if the present lens position frp is the same as the value of Scfp[0], since the result of the predicting processing is not yet "OK", the value of Scfp[0] is updated as the value which is a sum of the value of Scfp[0] and newly added "+2" (S.507). Then, the processing flow moves to S.508 to set the ov value, which is set to zero when the scanning processing starts, to "+1".

Then, the processing flow moves to S.509 and it is judged whether or not the ov value is 5 or more. Thereby, while it is not judged as "OK" in the predicting processing, the initial Scfp[0] is updated up to five times to control the lens position.

If it is not judged as "OK" even after Scfp[0] is updated five times, the processing flow moves to S.510 to change the driving parameters of the pulse motor so as to stop driving the focus lens. Then CCDAFmode is set to 3 (CCDAFmode=3) and the processing flow moves to S.512 to perform the evaluation value interrupt inhibit processing. After the evaluation value interrupt is inhibited, when the driving control of the focus lens is completed, the processing flow escapes from the scanning processing stop waiting loop of S.33 in FIG. 9.

If it is judged that the present lens position frp of the focus lens fL is the lens position fp' stored in the array Scfp[3] in S.52, and the focus evaluation value FV at the lens position fp' stored in the array Scfp[3] is smaller than the predetermined value in S.55, it is judged as "Yes" in S.55 and the processing flow moves to S.59.

In S.59, the scanning mode CCDAFmode is set to 2 (CCDAFmode=2). Then, the switching processing for changing the focus evaluation value acquiring processing using two-pulse interval to the focus evaluation value acquiring processing using four-pulse interval is performed (S.60).

The switching processing for changing the focus evaluation value acquiring processing using the two-pulse interval to the focus evaluation value acquiring processing using the four-pulse interval is not necessarily required if the present lens position frp does not yet reach the acquisition lens position fp' stored in the array Scfp[2] but is required if the scanning mode CCDAFmode is set to 2 (CCDAFmode=2) after the present lens position frp reaches the acquisition lens position fp' stored in the array Scfp[2].

The CPU 8 sets the acquisition lens position fp' as the lens position fp where the focus lens is driven from the present lens position frp by four pulses (S.61).

Then, the processing flow moves to S.62 and it is judged whether or not the focus evaluation value FV acquired at the acquisition lens position fp' at the present time is smaller than the focus evaluation value FV acquired at the acquisition lens position fp' at the previous time.

If the focus evaluation value FV acquired at the acquisition lens position fp' at the present time is larger than the focus evaluation value FV acquired at the acquisition lens position fp' at the previous time, or if the focus evaluation value FV acquired at the acquisition lens position fp' at the present time is not smaller than the focus evaluation value FV acquired at the acquisition lens position fp' at the previous time twice in series, it is judged as "No" and the processing flow returns to the scanning start processing and the processings of S.51, S.59 to S.62 are repeated.

Then, during the processings of S.51, S.59 to S.62, of the focus evaluation value FV acquired at the acquisition lens position fp' at the present time is smaller than the focus evaluation value FV acquired at the acquisition lens position fp' at the previous time twice in series (that is, two decreased values are detected in series) in S.62, it is judged as "Yes" and the processing flow moves to S.63 to perform a calculating processing for calculating the optimum focus lens position fbp.

After that, the CPU 8 performs the lens stop switching processing (S.64). Thereby, the pulse motor is once stopped and the evaluation value interrupt inhibit processing is performed (S.65) and then the processing flow returns to the scanning processing shown in FIG. 9.

Then, in S.34 in the scanning processing in FIG. 9, the scanning mode CCDAFmode is judged. If CCDAFmode=2, the overrun correction control is performed (S.35).

The processings of S.51, S.59 to S.62 are processings used when reliability of the predicted focus lens position fp" is low.

Other Examples

In the above described examples, it is described to determine an acquiring timing for acquiring the focus evaluation value FV based on the target lens position AFfp acquired by use of the ranging sensor as the target position determining device. However, other than using the lens position fp corresponding to the ranging result as the target lens position AFfp, the present invention is applicable even if user of the digital still camera uses a distance or a lens position manually specified by a specifying device as the target lens position AFfp.

In the digital still camera, a relationship between a distance to the subject and the lens position fp of the focus lens fL is adjusted when the digital still camera is manufactured and the data is stored in a not-illustrated nonvolatile memory in a body.

However, there are variations in the adjustment when the digital camera is manufactured. Furthermore, the subject is not always exactly positioned at the distance specified by the user while visually observing the subject. Accordingly, if the user is intended to perform photographing using the distance specified by the user, it is possible to miss the focusing on the subject to be focused. Therefore, it is preferable that the lens position based on the distance specified by the user is used as the target lens position AFfp and the scanning processing (CCDAF processing) is performed at the vicinity of the target lens position AFfp as described in Example 1.

INDUSTRIAL APPLICABILITY

The present invention is applicable to an electronic imaging apparatus and a digital still camera.

EFFECT OF INVENTION

According to an embodiment of the present invention, there is an advantageous effect in that a time required from when acquiring a focus evaluation value by driving a focus lens to when the focusing of the focus lens is completed can be reduced.

That is, since the focus evaluation value generating device generates a focus evaluation value based on image data acquired through a focus lens to determine a focus lens position to a subject, and acquiring lens positions for acquiring a plurality of focus evaluation values between the present lens position of the focus lens and the target lens position are determined, there are advantageous effects in that overrun of the focus lens can be prevented before happens, that is, it can be prevented that during scanning for acquiring the focus evaluation value, the end lens position of the focus lens after the focus evaluation value is acquired exceeds the optimum focus lens position corresponding to the peak value. There may be also advantageous effect in that the overrun amount of the focus lens is reduced and sets in a range without problems on focusing.

In other words, since the target lens position of the focus lens to the subject is determined, and the acquisition lens position for acquiring the focus evaluation value (that is, for sampling the focus evaluation value) is determined based on the target lens position, probability for preventing overrun of the focus lens, that is, preventing the end lens position of the focus lens after acquiring the focus evaluation value during scanning for acquiring the focus evaluation values from exceeding the optimum focus lens position corresponding to the peak value is further increased.

Although the present invention has been described in terms of exemplary embodiments, it is not limited thereto. It should be appreciated that variations may be made in the embodiments described by persons skilled in the art without departing from the scope of the present invention as defined by the following claims.

CROSS REFERENCE TO RELATED APPLICATIONS

This application is based on and claims priority from Japanese Patent Application No. 2010-003605, filed on Jan. 12, 2010, the disclosure of which is incorporated herein by reference in its entirety.

The invention claimed is:

1. An auto-focus controlling apparatus for controlling a focusing operation of a focus lens, comprising:
    a focus evaluation value generating device configured to generate a focus evaluation value based on image data of a subject which is acquired through the focus lens to determine a focus lens position of the focus lens to the subject;
    a target lens position determining device configured to determine a target lens position used in the focusing operation by driving the focus lens;
    a focus evaluation value acquiring timing determining device configured to determine a plurality of acquisition lens positions in which focus evaluation values are to be acquired in a direction from a present lens position of the focus lens toward the target lens position;
    a scanning device configured to drive the focus lens in an optical axis direction and in the direction from the present lens position of the focus lens to the target lens position to acquire the focus evaluation value at each of the plurality of acquisition lens positions;
    a predicted focus lens position determining device configured to predict a predicted focus lens position based on the acquired focus evaluation values to determine the predicted focus lens position; and
    a moving device configured to stop the scanning device to drive the focus lens when the predicted focus lens position is determined and to drive the focus lens in a direction where the focus lens is driven by the scanning device to move the focus lens to the predicted focus lens position, wherein
    the predicted focus lens position determining device is configured to form a characteristic curve having a hill shape formed based on the acquired focus evaluation values, calculate slopes of the characteristic curve, and predict the predicted focus lens position based on the slopes when the slopes of the characteristic curve are decreased at least twice in series, and
    the predicted focus lens position determining device is configured to calculate a decreased ratio based on the slopes of the characteristic curve, correct the predicted focus lens position based on the decreased ratio, and determine the corrected predicted focus lens position as the predicted focus lens position.

2. The auto-focus controlling apparatus according to claim 1, wherein
    the predicted focus lens position determining device includes a judging device configured to judge whether or not the focus lens is to be driven to a lens position across the target lens position during moving the focus lens from the present lens position to the target lens position;
    the scanning device is configured to be changed from a mode where the focus lens is driven to the acquisition lens positions determined by the focus evaluation value acquiring timing determining device to a mode where the focus evaluation value is acquired at a lens position which exceeds the target lens position, based on a judged result of the judging device.

3. The auto-focus controlling apparatus according to claim 1, wherein
    the target lens position determining device is configured to set a distance from the focus lens to the subject and determine the target lens position so as to correspond to the set distance.

4. The auto-focus controlling apparatus according to claim 3, wherein the target lens position determining device is a ranging sensor configured to measure a distance to the subject.

5. The auto-focus controlling apparatus according to claim 3, wherein the target lens position determining device is a specifying device configured to allow the distance to the subject to be manually specified.

6. The auto-focus controlling apparatus according to claim 3, wherein the target lens position determining device is a ranging sensor configured to measure the distance to the subject based on a defocused amount defocused from the subject.

7. The auto-focus controlling apparatus according to claim 1, wherein the focus evaluation value acquiring timing determining device is configured to determine the acquisition lens positions so as to decrease intervals between adjacent acquisition lens positions as adjacent focus lens positions are closer to the target lens position.

8. The auto-focus controlling apparatus according to claim 1, wherein the focus evaluation value acquiring timing determining device is configured to determine the acquisition lens positions in a direction from a lens position having a large value to a lens position having a small value if the present lens position is smaller than the target lens position.

9. The auto-focus controlling apparatus according to claim 1, wherein the focus evaluation value acquiring timing determining device is configured to determine the acquisition lens positions in a direction from a lens position having a small value to a lens position having a large value if the present lens position is larger than the target lens position.

10. The auto-focus controlling apparatus according to claim 1, wherein the focus evaluation value acquiring timing determining device is configured to determine a time for acquiring the focus evaluation value at each acquisition lens position.

11. The auto-focus controlling apparatus according to claim 1, wherein
the direction where the focus lens is driven from the present lens position to the target lens position by the scanning device corresponds to a direction where backlash does not occur.

12. An electronic imaging apparatus comprising the auto-focus controlling apparatus according to claim 1.

* * * * *